(12) United States Patent
Tsai et al.

(10) Patent No.: US 12,349,154 B2
(45) Date of Patent: Jul. 1, 2025

(54) MONITORING PHYSICAL DOWNLINK CONTROL CHANNEL FOR SMALL DATA TRANSMISSION

(71) Applicant: SHARP KABUSHIKI KAISHA, Sakai (JP)

(72) Inventors: Hsin-Hsi Tsai, Taipei (TW); Heng-Li Chin, Taipei (TW); Wan-Chen Lin, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 411 days.

(21) Appl. No.: 17/689,347

(22) Filed: Mar. 8, 2022

(65) Prior Publication Data

US 2022/0295540 A1    Sep. 15, 2022

Related U.S. Application Data

(60) Provisional application No. 63/158,813, filed on Mar. 9, 2021.

(51) Int. Cl.
*H04W 72/23*    (2023.01)
*H04W 24/08*    (2009.01)
(Continued)

(52) U.S. Cl.
CPC ........... *H04W 72/23* (2023.01); *H04W 24/08* (2013.01); *H04W 72/1273* (2013.01);
(Continued)

(58) Field of Classification Search
CPC . H04W 72/23; H04W 24/08; H04W 72/1273; H04W 74/0833; H04W 76/20;
(Continued)

(56) References Cited

U.S. PATENT DOCUMENTS 12,193,074 B2 *    1/2025    Tseng .................... H04W 72/23
2020/0008137 A1    1/2020    Li et al.
(Continued)

FOREIGN PATENT DOCUMENTS

| CN | 110831197 | | 2/2020 | |
|---|---|---|---|---|
| EP | 3934346 A1 | * | 1/2022 | ........ H04W 72/1268 |
| WO | 2020029175 | | 2/2020 | |

OTHER PUBLICATIONS

3GPP TS 38.214, "3rd Generation Partnership Project; Technical Specification Group Radio Access Network; NR; Physical layer procedures for data (Release 16)", Technical Specification, V16.4.0 (Dec. 2020).

(Continued)

*Primary Examiner* — Mounir Moutaouakil
(74) *Attorney, Agent, or Firm* — ScienBiziP, P.C.

(57) ABSTRACT

A method for a user equipment (UE) to monitor a physical downlink control channel (PDCCH) is provided. The method receives, while being in a radio resource control (RRC)_CONNECTED state, from a base station (BS), an RRC release message that includes a small data transmission (SDT) configuration. After receiving the RRC release message, the method transitions to an RRC_INACTIVE state from the RRC_CONNECTED state in response to receiving the RRC release message. The method then initiates an SDT procedure based on the SDT configuration. The method further determines whether a search space set associated with an SDT search space is received from the BS. The method monitors the PDCCH by monitoring the search space set during the SDT procedure when the search space set is received from the BS.

16 Claims, 8 Drawing Sheets

(51) Int. Cl.
*H04W 72/1273* (2023.01)
*H04W 74/0833* (2024.01)
*H04W 76/20* (2018.01)
*H04W 76/30* (2018.01)

(52) U.S. Cl.
CPC ....... *H04W 74/0833* (2013.01); *H04W 76/20* (2018.02); *H04W 76/30* (2018.02)

(58) Field of Classification Search
CPC .... H04W 76/30; H04W 76/27; H04L 5/0053; H04L 5/0094
See application file for complete search history.

(56) References Cited

U.S. PATENT DOCUMENTS

| | | | |
|---|---|---|---|
| 2021/0274525 A1* | 9/2021 | Wei | H04W 76/27 |
| 2021/0298108 A1 | 9/2021 | Wu et al. | |
| 2021/0337625 A1* | 10/2021 | Tsai | H04W 76/27 |
| 2021/0410180 A1* | 12/2021 | Tsai | H04L 1/1819 |
| 2022/0022247 A1* | 1/2022 | Agiwal | H04W 56/001 |
| 2023/0262688 A1* | 8/2023 | Kiilerich Pratas | H04W 72/1268 370/329 |
| 2024/0023042 A1* | 1/2024 | Chen | H04W 56/0015 |
| 2024/0098679 A1* | 3/2024 | Ghimire | H04W 24/10 |

OTHER PUBLICATIONS

3GPP TS 38.300, "3rd Generation Partnership Project; Technical Specification Group Radio Access Network; NR; NR and NG-RAN Overall Description; Stage 2 (Release 16)", Technical Specification, V16.4.0 (Dec. 2020).
3GPP TS 38.212, "3rd Generation Partnership Project; Technical Specification Group Radio Access Network; NR; Multiplexing and channel coding (Release 16)", Technical Specification, V16.3.0 (Sep. 2020).
3GPP TS 38.213, "3rd Generation Partnership Project; Technical Specification Group Radio Access Network; NR; Physical layer procedures for control (Release 16)", Technical Specification, V16.4.0 (Dec. 2020).
3GPP TS 38.321, "3rd Generation Partnership Project; Technical Specification Group Radio Access Network; NR; Medium Access Control (MAC) protocol specification (Release 16)", Technical Specification, V16.3.0 (Dec. 2020).
3GPP TS 38.331, "3rd Generation Partnership Project; Technical Specification Group Radio Access Network; NR; Radio Resource Control (RRC) protocol specification (Release 16)", Technical Specification, V16.3.1 (Jan. 2021).
Vivo, Discussion on RAN1 impacts for small data transmission, 3GPP TSG RAN WG1 #104-e, e-Meeting, Jan. 25-Feb. 5, 2021, R1-2101159, sections 2-3.
Zte et al: "Discussion on the physical layer aspects of small data transmission", R1-2100080, 3GPP TSG RAN WG1 #104-e, e-Meeting, Jan. 25-Feb. 5, 2021 (Jan. 19, 2021).

* cited by examiner

MONITORING PHYSICAL DOWNLINK CONTROL CHANNEL FOR SMALL DATA TRANSMISSION

CROSS-REFERENCE TO RELATED APPLICATION(S)

The present application claims the benefit of and priority to U.S. Provisional Patent Application Ser. No. 63/158,813, filed on Mar. 9, 2021, entitled "PDCCH MONITORING IN RRC INACTIVE STATE," the content of which is hereby incorporated fully by reference herein into the present disclosure.

FIELD

The present disclosure generally relates to wireless communications, and more particularly, to monitoring of physical downlink control channel (PDCCH) by a user equipment (UE).

BACKGROUND

With the tremendous growth in the number of connected devices and the rapid increase in user/network traffic volume, various efforts have been made to improve different aspects of wireless communication for the next-generation wireless communication systems, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In the third Generation Partnership Project (3GPP), NR may support a radio resource control (RRC)_INACTIVE state in which a network (NW) may maintain the UEs with infrequent (e.g., periodic and/or non-periodic) data transmissions. Not until 3GPP Release 16 (Rel-16) did the RRC_INACTIVE state support data transmission. Thus, the UEs prior to Rel-16 may have to resume the connection (e.g., move to an RRC_CONNECTED state) for any downlink (DL) data reception and/or uplink (UL) data transmission. Connection setup(s) and subsequently release(s) to an RRC_INACTIVE state may apply for each data transmission regardless of how small and infrequent the corresponding data packets may be, which may result in unnecessary power consumption and signaling overhead.

Signaling overhead, from UEs that are in an RRC_INACTIVE state, due to transmission of small data packets, may, however, become a general problem and a critical issue as the number of UEs increases in an NR network not only for the network performance and efficiency but also for the UEs' battery performance. In general, any UE (e.g., device) that has intermittent small data packets in an RRC_INACTIVE state may benefit from enabling small data transmission (SDT) in the RRC_INACTIVE state. Key enablers for the SDT in NR, namely an RRC_INACTIVE state, such as a 2-step RACH, a 4-step RACH and/or a configured grant type-1, have already been specified as part of the legacy wireless standard. Thus, the present disclosure may improve upon the legacy standard and enable the SDT for the UEs that are in an RRC_INACTIVE state for NR.

SUMMARY

As discussed above, the present disclosure is directed to a method for monitoring the PDCCH in SDT to receive scheduling for data transmission from a NW. The method may include the determination of how and when to monitor the PDCCH in SDT in order to receive scheduling, for example, via downlink control information (DCI).

In a first aspect of the present disclosure, a method for a user equipment (UE) to monitor PDCCH is provided. The method receives, while in a radio resource control (RRC)_CONNECTED state, from a base station (BS), an RRC release message that includes an SDT configuration. The UE transitions to an RRC_INACTIVE state from the RRC_CONNECTED state in response to receiving the RRC release message. The method initiates an SDT procedure based on the SDT configuration, determines whether a search space set associated with an SDT search space is received from the BS, and monitors the PDCCH by monitoring the search space set during the SDT procedure when the search space set is received from the BS.

In an implementation of the first aspect, when the SDT procedure comprises a random access (RA)-based SDT procedure and the search space set is not received from the BS, the method further monitors the PDCCH by monitoring a common search space set that is associated with an RA search space during the SDT procedure.

In another implementation of the first aspect, when the SDT procedure includes a random access (RA)-based SDT procedure, the search space set includes a common search space (CSS) set.

In another implementation of the first aspect, when the search space set includes the CSS set, the SDT search space is configured via a PDCCH common configuration (PDCCH-ConfigCommon) information element (IE). The PDCCH common configuration may be configured by system information and/or by SIB1.

In another implementation of the first aspect, the method further includes monitoring the PDCCH which includes monitoring the PDCCH after determining that an RA procedure is successfully completed and until the RA-based SDT procedure is terminated, when the SDT procedure includes a random access (RA)-based SDT procedure.

In another implementation of the first aspect, the method further includes monitoring the PDCCH which includes monitoring the PDCCH addressed to a cell-radio network temporary identifier (C-RNTI), when the SDT procedure includes a random access (RA)-based SDT procedure.

In another implementation of the first aspect, when the SDT procedure includes a configured grant (CG)-based SDT procedure, the search space set includes a UE-specific search space (USS) set.

In another implementation of the first aspect, when the search space set includes the USS set, the SDT search space is configured via a PDCCH configuration (PDCCH-Config) information element (IE) received in the RRC release message. The PDCCH configuration may be configured by a BWP configuration dedicated for SDT.

In another implementation of the first aspect, the method further includes monitoring the PDCCH which includes monitoring the PDCCH after an initial transmission for the CG-based SDT procedure and until the CG-based SDT procedure is terminated, when the SDT procedure includes a configured grant (CG)-based SDT procedure.

In another implementation of the first aspect, the method further includes monitoring the PDCCH which comprises monitoring the PDCCH addressed to a cell-radio network temporary identifier (C-RNTI) and a configured scheduling-radio network temporary identifier (CS-RNTI) when the SDT procedure comprises a configured grant (CG)-based SDT procedure.

In a second aspect, a UE is provided. The UE includes one or more non-transitory computer-readable media storing computer-executable instructions for monitoring PDCCH. The UE also includes at least one processor coupled to the one or more non-transitory computer-readable media, and configured to execute the computer-executable instructions to receive, while in a radio resource control (RRC)_CONNECTED state, from a base station (BS), an RRC release message that includes a small data transmission (SDT) configuration. The UE is further configured to transition to an RRC_INACTIVE state from the RRC_CONNECTED state in response to receiving the RRC release message. The UE is further configured to initiate an SDT procedure based on the SDT configuration. The UE is further configured to determine whether a search space set associated with an SDT search space is received from the BS. The UE is further configured to monitor the PDCCH by monitoring the search space set during the SDT procedure when the search space set is received from the BS.

In an implementation of the second aspect, the at least one processor is further configured to execute the computer-executable instructions to, when the SDT procedure includes a random access (RA)-based SDT procedure and the search space set is not received from the BS, monitor the PDCCH by monitoring a common search space set that is associated with an RA search space during the SDT procedure.

In another implementation of the second aspect, when the SDT procedure includes a random access (RA)-based SDT procedure, the search space set comprises a common search space (CSS) set.

In another implementation of the second aspect, when the search space set includes the CSS set, the SDT search space is configured via a PDCCH common configuration (PDCCH-ConfigCommon) information element (IE). The PDCCH common configuration may be configured by system information and/or by SIB1.

In another implementation of the second aspect, the at least one processor is further configured to execute the computer-executable instructions to monitor the PDCCH which includes monitoring the PDCCH after determining that an RA procedure is successfully completed and until the RA-based SDT procedure is terminated, when the SDT procedure includes a random access (RA)-based SDT procedure.

In another implementation of the second aspect, the at least one processor is further configured to execute the computer-executable instructions to monitor the PDCCH which includes monitoring the PDCCH addressed to a cell-radio network temporary identifier (C-RNTI), when the SDT procedure includes a random access (RA)-based SDT procedure.

In another implementation of the second aspect, when the SDT procedure includes a configured grant (CG)-based SDT procedure, the search space set includes a UE-specific search space (USS) set.

In another implementation of the second aspect, when the search space set includes the USS set, the SDT search space is configured via a PDCCH configuration (PDCCH-Config) information element (IE) received in the RRC release message. The PDCCH configuration may be configured by a BWP configuration dedicated for SDT.

In another implementation of the second aspect, the at least one processor is further configured to execute the computer-executable instructions to monitor the PDCCH which includes monitoring the PDCCH after an initial transmission for the CG-based SDT procedure and until the CG-based SDT procedure is terminated, when the SDT procedure includes a configured grant (CG)-based SDT procedure.

In another implementation of the second aspect, the at least one processor is further configured to execute the computer-executable instructions to monitor the PDCCH which includes monitoring the PDCCH addressed to a cell-radio network temporary identifier (C-RNTI) and a configured scheduling-radio network temporary identifier (CS-RNTI), when the SDT procedure includes a configured grant (CG)-based SDT procedure.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
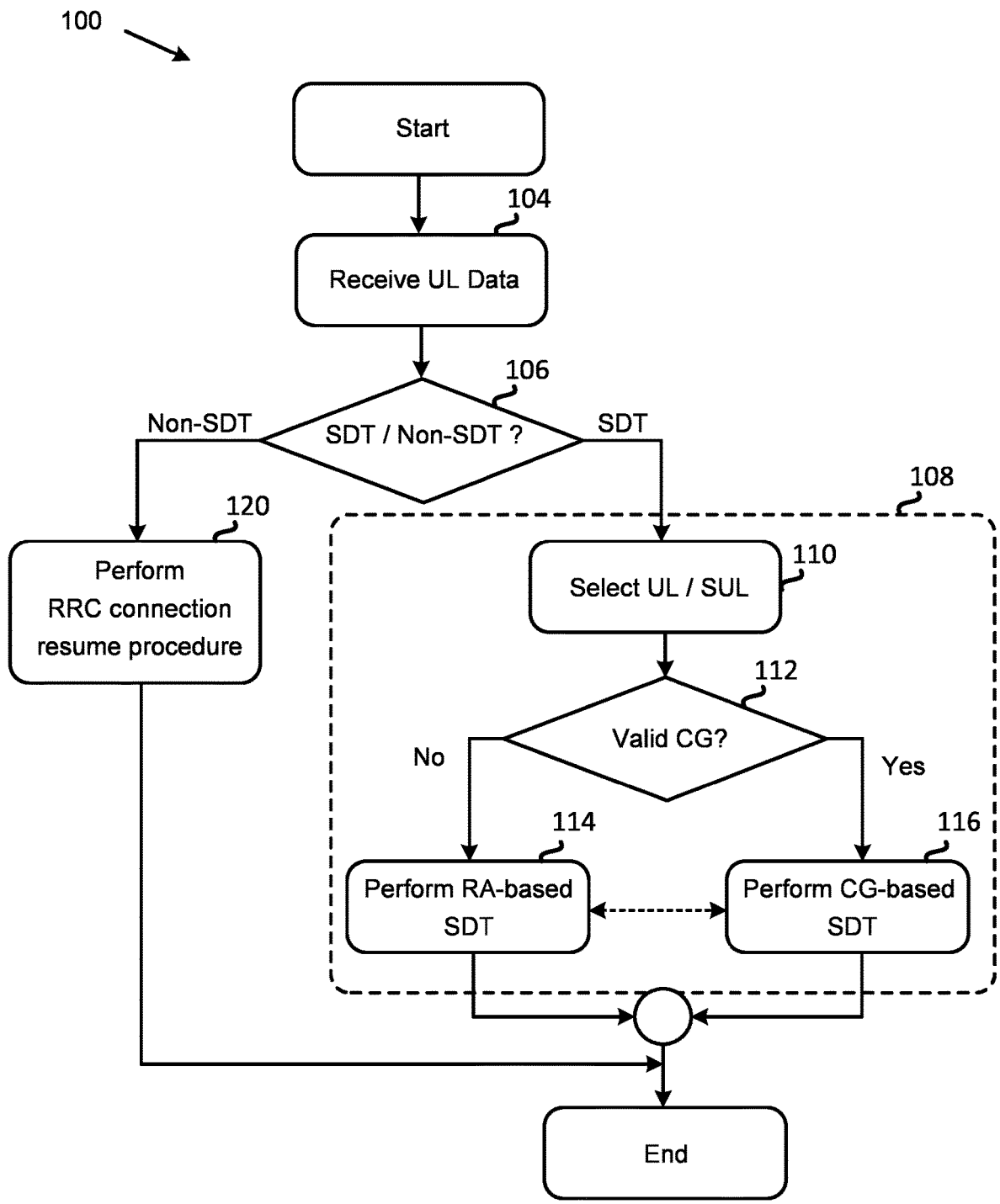
FIG. 1 is a schematic diagram illustrating a process performed by a UE for performing an SDT procedure, according to an example implementation of the present disclosure.

The acronyms in the present disclosure are defined as follows and unless otherwise specified, the acronyms have the following meanings:

| Acronym | Full name |
|---|---|
| Alt | Alternative |
| AS | Access Stratum |
| ACK | Acknowledgement |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CORESET | Control Resource Set |
| C-RNTI | Cell-Radio Network Temporary Identifier |

-continued

| Acronym | Full name |
| --- | --- |
| CSI | Channel State Information |
| CS-RNTI | Configured Scheduling RNTI |
| CSS | Common Search Space |
| DCI | Downlink Control Information |
| DG | Dynamic Grant |
| DL | Downlink |
| DM-RS | Demodulation Reference Signal |
| DRB | Data Radio Bearer |
| DRX | Discontinuous Reception |
| FR | Frequency Range |
| HARQ | Hybrid Automatic Repeat reQuest |
| IE | Information Elements |
| LCH | Logical Channel |
| LCP | Logical Channel Prioritization |
| MAC | Medium Access Control |
| MCG | Master Cell Group |
| MIB | Master Information Block |
| Msg/MSG | Message |
| NACK | Negative- or Non-Acknowledgement |
| NAS | Non-Access Stratum |
| NR | New Radio |
| NW | Network |
| NUL | Normal Uplink |
| Pcell | Primacy Cell |
| PDCCH | Physical Downlink Control Channel |
| PDSCH | Physical Downlink Shared Channel |
| PDU | Protocol Data Unit |
| PHY | Physical Layer |
| PRACH | Physical Random Access Channel |
| PUCCH | Physical Uplink Control Channel |
| PUSCH | Physical Uplink Shared Channel |
| QCL | Quasi Co Location |
| RA | Random Access |
| RACH | Random Access Channel |
| RAR | Random Access Response |
| Rei | Release |
| RLC | Radio Link Control |
| RNTI | Radio Network Temporary Identifier |
| RO | RACH Occasion |
| RRC | Radio Resource Control |
| RS | Reference Signal |
| RSRP | Reference Signal Received Power |
| Rx | Reception |
| Scell | Secondary Cell |
| SCG | Secondary Cell Group |
| scs | Subcarrier Spacing |
| SDT | Small Data Transmission |
| SDU | Service Data Unit |
| SI | System Information |
| SIB | System Information Block |
| SPS | Semi-Persistent Scheduling |
| SRB | Signaling Radio Bearer |
| SS | Search Space |
| SSB | SS/PBCH Block |
| SS-RSRP | Synchronization Signal-RSRP |
| SUL | Supplementary Uplink |
| TA | Timing Alignment/Timing Advance |
| TAT | Timing Alignment Timer |
| TCI | Transmission Configuration Indicator |
| TS | Technical Specification |
| Tx | Transmission |
| TBS | Transport Block Size |
| TRP | Transmission and Reception Point |
| UCI | Uplink Control Information |
| UE | User Equipment |
| UL | Uplink |
| USS | UE-specific Search Space |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in some implementations," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

The following terminologies are defined but are not necessarily limited to the meaning provided below so as far as to indicate open-ended inclusion or membership in the so-described meaning and the equivalent thereof.

In some implementations, an SDT may be a UL data transmission by a UE in an RRC_INACTIVE state. Packet size (or data volume) of the UL data may be lower than a specified threshold in some such implementations. In some implementations, the UL data of an SDT may be transmitted during an SDT procedure. In some implementations, the UL data of an SDT may be transmitted via an Msg 3 (e.g., based on a 4-step RA), via an MsgA (e.g., based on a 2-step RA), and/or via a CG resource (e.g., CG type 1). In some implementations, the UL data of an SDT may be transmitted based on a dynamic scheduling and/or a semi-persistent scheduling when the UE is in an RRC_INACTIVE state.

In some implementations, a NW may be a network node, a TRP, a cell (e.g., an SpCell, Pcell, PSCell, and/or an Scell), an eNB, a gNB, and/or a base station.

The terms "initiate", "trigger", and/or "start", may be interchangeably used in some implementations of the present disclosure. The terms "terminate", "stop", "release", "suspend", "discard", "end", "complete", "abort", and/or "cancel", may be interchangeably used in some implementations of the present disclosure. The terms "period", "process", and/or "duration" may be interchangeably used in some implementations of the present disclosure. The terms "resource" and/or "occasion" may be interchangeably used in some implementations of the present disclosure. Additionally, the terms "ongoing", "running", and/or "pending" may be interchangeably used in some implementations of the present disclosure.

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art may immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable media, such as memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations described in this specification are oriented to software installed and executed on computer hardware, nevertheless, alternative example implementations implemented as firmware or as hardware or combination of hardware and software are well within the scope of the present disclosure.

The computer readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an UE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet) through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. In some implementations, a UE may be referred to as a PHY/MAC/RLC/PDCP/SDAP/RRC entity. Similarly, a PHY/MAC/RLC/PDCP/SDAP/RRC entity may be referred to a UE. The UE is configured to receive and transmit signals over an air interface from/to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned entities/protocols.

A base station may include, but is not limited to, a node B (NB) as in the UNITS, an evolved node B (eNB) as in the LTE or LTE-A, a radio network controller (RNC) as in the UNITS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to the network to serve the one or more UEs through a radio interface.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell).

A cell or a serving cell may include a Primary Cell (Pcell), a Primary SCG Cell (PSCell), or a Secondary Cell (Scell). The serving cell may be an activated or a deactivated serving cell. For Dual Connectivity operation, the term Special Cell (SpCell) refers to the Pcell of the MCG (Master Cell Group)

or the PSCell of the SCG (Secondary Cell Group) depending on if the MAC entity is associated to the MCG or the SCG, respectively. Otherwise, the term Special Cell refers to the Pcell.

The Pcell may refer to the SpCell of an MCG. The PSCell may refer to the SpCell of an SCG. MCG may refer to a group of serving cells associated with the Master Node (MN), including the SpCell and optionally one or more Scells. An SCG may refer to a group of serving cells associated with the Secondary Node (SN), including the SpCell and optionally one or more Scells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology, as agreed in 3GPP, may serve as a baseline for NR waveform. The scalable OFDM numerology, such as the adaptive sub-carrier spacing, the channel bandwidth, and the Cyclic Prefix (CP), may also be used in some implementations of the present disclosure. Additionally, at least two coding schemes may be considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the Pcell and zero or more secondary cells. Conversely, the SCG is a set of one or more serving cells including the PSCell and zero or more secondary cells.

As also described above, the Primary Cell (Pcell) may be an MCG cell that operates on the primary frequency, in which the UE either performs the initial connection establishment procedure or initiates the connection reestablishment procedure. In the MR-DC mode, the Pcell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a Pcell of the MCG, or a PS Cell of the SCG, depending on whether the MAC entity is associated with the MCG or the SCG. Otherwise, the term Special Cell may refer to the Pcell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (Scell) which may be the primary cell. Conversely, for a UE in the RRC_CONNECTED state that is configured with the CA/DC a set of serving cells including the special cell(s) and all of the secondary cells may communicate with the UE.

As discussed above, the present disclosure may improve upon the legacy standards and enable the SDT for a UE in an RRC_INACTIVE state for NR. The present disclosure relates to monitoring (e.g., when and where to monitor) the PDCCH in the SDT to receive (e.g., via DCI) scheduling for data transmission from/to the network.

Conventionally, a UE may monitor a common search space (CSS) set for the PDCCH. In such a scheme, because of employing a common search space (SS), there might be collisions between the data transmissions of the UE with data transmissions of other UEs and, as a result, network congestion might be inevitable.

To avoid such collisions and subsequent network congestion, the network may configure the UE with a CSS set that is specific to the SDT. This CSS may be used only by the UEs that are performing an SDT procedure. A conventional (or regular) CSS, however, may be used by all the UEs (which may cause network congestion and/or collisions).

In some implementations, certain assumptions may be made for SDT. In some implementations, SDT may be supported as a baseline for RA-based SDT and CG-based SDT schemes. Stored "configuration" in a UE Context may be used for an RLC bearer configuration. A 2-step RACH or a 4-step RACH may be applied to an RA-based SDT by a UE that is in an RRC_INACTIVE state. In some implementations, uplink small data may be sent in an MSGA of a 2-step RACH and/or an MSG3 of a 4-step RACH. SDT may be configured by a network on a per data DRB basis. In some implementations, a data volume threshold may be used for a UE to decide whether to perform (or select) an SDT (or a non-SDT) procedure. In some implementations, a UL/DL transmission following a UL SDT without transitioning to an RRC_CONNECTED state (e.g., from an RRC_INACTIVE state) may be supported. In some implementations, when a UE is in an RRC_INACTIVE state, multiple UL and DL packets may be sent as part of the same SDT procedure and without transitioning to an RRC_CONNECTED state (e.g., the UE may maintain its RRC_INACTIVE state during the SDT procedure) on a dedicated grant.

In some implementations, further assumptions may be made for SDT. When a UE receives an RRC release message with a "Suspend" configuration, one or more of the followings may occur: the MAC entity (of the UE) may be reset, and a default MAC cell group configuration may be released; the RLC entities (of the UE) for SRB1 may be re-established; and the SRBs and/or DRBs may be suspended (e.g., except for the SRB0).

In some implementations, further assumptions may be made for SDT. For example, upon initiating an SDT procedure (e.g., for the first transmission of small data), a UE may re-establish at least the PDCP entities (e.g., for SDT) and resume the DRBs (e.g., for SDT), for example, along with SRB1. Depending on the size of a first UL message, the first UL message (e.g., an MSG3 for a 4-step RACH, an MSGA for a 2-step RACH, and a CG transmission for a CG) may contain at least one of the followings: a CCCH, DRB data from one or more DRBs which are configured by the network for SDT, MAC Ces (e.g., a BSR), and padding bits. In some implementations, for the CCCH message, an LCP may be used to determine the priority of the content.

In some implementations, further assumptions may be made for SDT. For example, the CCCH message may contain ResumeMAC-I generated by using a stored security key for RRC integrity protection. New keys may be generated using stored security context and an NCC value may be received in a previous RRC-Release message. The new keys may be used for generating the data of DRBs that are configured for SDT. In some implementations, for a CG-based SDT, a configuration of CG resource(s) for the uplink small data transmission may be contained in the RRCRelease message. In some implementations, for a CG-based SDT, a new TA timer for TA maintenance specified for CG based small data transmission in an RRC_INACTIVE state may be introduced. The TA timer may be configured together with the CG configuration in the RRCRelease message. In some implementations, for a CG-based SDT, a configuration of CG resource for the UE's SDT may be valid only in the same serving cell. In some implementations, for a CG-based SDT, a UE may use CG-based small data transmission if at least one of the following criteria is fulfilled: user data is smaller than a data volume threshold; CG resource is configured and valid; and a UE has a valid TA. In some implementations, for a CG-based SDT, an association between the CG resources and the SSBs may be required.

In some implementations, further assumptions may be made for SDT. For a CG-based SDT, an SS-RSRP threshold may be configured for the SSB selection. A UE may select one of the SSBs with an SS-RSRP that is above a threshold and may select the associated CG resource for a UL data transmission. In some implementations, for a CG-based SDT, a CG-SDT resource configuration may be provided to the UEs that are in an RRC_CONNECTED state (e.g., via the RRCRelease message). In some implementations, for a CG-based SDT, CG-PUSCH resources may be separately configured for an NUL and/or an SUL. In some implementations, for a CG-based SDT, an RRCRelease message may be used to reconfigure or release CG-SDT resources while a UE is in an RRC_INACTIVE state. In some implementations, for a CG-based SDT, subsequent data transmission(s) may use CG resource(s) or DG resource(s), e.g., via dynamic grant that is addressed to the UE's C-RNTI. The C-RNTI may be the same as the previous C-RNTI stored at the UE or may be configured explicitly by a network. In some implementations, for CG-based SDT, a timing alignment timer (TAT) may be started upon receiving a TAT configuration from a gNB, e.g., through an RRCrelease message, and may be start or restart upon reception of a TA command. In some implementations, for a CG-based SDT, a UE may release the CG resources when the TAT expires (e.g., while the UE is in the RRC_INACTIVE state).

In some implementations, further assumptions may be made for SDT. For example, for an RA-SDT, up to two preamble groups (e.g., corresponding to two different payload sizes for an MSGA/MSG3) may be configured by a network. In some implementations, if a RACH procedure is initiated for SDT (e.g., RA-SDT initiated), a UE may first perform a RACH type selection as specified in a MAC (e.g., in Rel-16), then whether a threshold is SDT specific or not may be determined by the UE. In some implementations, for an RA-based SDT, upon successful completion of contention resolution, a UE may monitor a C-RNTI. In some implementations, for an RA-based SDT, the RACH resource (e.g., a RACH Occasion (RO)+preamble combination) may be different between an SDT and a non-SDT (e.g., in an RRC connection resume message). In some implementations, if Ros for an SDT and a non-SDT are different, preamble partitioning between an SDT and a non-SDT may not be needed. In some implementations, if Ros for an SDT and a non-SDT are the same, preamble partitioning may be needed. In some implementations, for an RA-based SDT, up to two preamble groups, corresponding to two different payload sizes for an MSGA/MSG3, may be configured by a network. In some implementations, for an RA-based SDT, an RRCRelease message may be sent at the end to terminate the SDT procedure (e.g., from the point of view of the RRC). The RRCRelease message sent at the end of the SDT may contain CG resource(s). An RSRP threshold may be used to select between the SDT and non-SDT procedures (e.g., in an RRC connection resume procedure).

In some implementations, further assumptions may be made for SDT. For example, in an SDT, a UE may perform UL carrier selection (e.g., a UL and an SUL selection). In some implementations, if CG-SDT resources are configured on the selected UL carrier and are valid, then a CG-based SDT may be selected to perform. Otherwise, if 2-step RA resources (e.g., for SDT) are configured on the UL carrier and the criteria to select the 2-step RA (e.g., for SDT) are met, then the 2-step RA (e.g., for SDT) may be chosen. Otherwise, if 4-step RA resources (e.g., for SDT) are configured on the UL carrier and the criteria to select the 4-step RA (e.g., for SDT) are met, then the 4-step RA may be chosen. Also, a UE may not perform the SDT procedure (e.g., the UE may perform an RRC connection resume procedure) under such a circumstance. In some implementations, if both 2-step RA (e.g., for SDT) and 4-step RA resources (e.g., for SDT) are configured on the UL carrier, the RA type selection (e.g., 2-step and 4-step RA type selection) may be performed based on an RSRP threshold.

In some implementations of the present disclosure, the purpose of an RRC connection resume procedure may be to resume a suspended RRC connection, including resuming the SRB(s) and DRB(s) or performing an RNA update. In some implementations, a UE may initiate the RRC connection resume procedure when the upper layers or AS (e.g., when responding to a RAN paging, or upon triggering RNA updates while the UE is in an RRC_INACTIVE state) requests the resumption of a suspended RRC connection. The suspension of the RRC connection may be initiated by a network. In some implementations, when the RRC connection is suspended, the UE may store the UE Inactive AS context and any configuration received from the network, and then transition to the RRC_INACTIVE state. In some implementations, an RRC message to suspend the RRC connection may be integrity protected and ciphered.

In some implementations, the resumption of a suspended RRC connection may be initiated by the upper layers when the UE needs to transition from an RRC_INACTIVE state to an RRC_CONNECTED state, by an RRC layer to perform an RNA update, or by a RAN paging from an NG-RAN. When the RRC connection is resumed, the network may configure the UE according to the RRC connection resume procedure based on the stored UE Inactive AS context and any RRC configuration received from the network. In some implementations, the RRC connection resume procedure may re-activate the AS security and may re-establish the SRB(s) and DRB(s).

In some implementations, in response to a request to resume a suspended RRC connection, the network may perform one of the followings. The network may resume the suspended RRC connection and send the UE to an RRC_CONNECTED state, the network may reject the request to resume and send the UE to an RRC_INACTIVE state (e.g., with a wait timer), the network may directly re-suspend the RRC connection and send the UE to an RRC_INACTIVE state, the network may directly release the RRC connection and send the UE to an RRC_IDLE state, or the network may instruct the UE to initiate an NAS level recovery (e.g., in such case, the network may send an RRC setup message to the UE). Further details of performing an RRC connection resume procedure in response to receiving a request to resume may be found in 3GPP TS 38.331 V16.3.1.

In some implementations of the present disclosure, two types of RA procedures, for example, a 4-step RA type with an MSG1 and a 2-step RA type with an MSGA, may be supported. In some implementations, both types of RA procedures may support contention-based random access (CBRA) and contention-free random access (CFRA) procedures. A UE may select the type of RA at initiation of the RA procedure based on the network configuration. In some implementations, when CFRA resources are not configured, an RSRP threshold may be used by the UE to select between the 2-step RA type and the 4-step RA type. In some implementations, when CFRA resources for the 4-step RA type are configured, the UE may perform the RA procedure with the 4-step RA type. In some implementations, when CFRA resources for the 2-step RA type are configured, the UE may perform the RA procedure with the 2-step RA type. In some implementations, the network may not configure CFRA resources for the 4-step and 2-step RA types at the same time for a Bandwidth Part (BWP). In some implementations, the CFRA with the 2-step RA type may only be supported for a handover procedure.

In some implementations, the MSG1 of the 4-step RA type may include a preamble on a PRACH. After an MSG1 transmission, a UE may monitor for a response from a network within a configured window. For CFRA, a dedicated preamble for an MSG1 transmission may be assigned by the network, and upon receiving an RA response from the network, the UE may end the RA procedure. For CBRA, upon reception of the RA response, the UE may send an MSG3 using a UL grant scheduled in the response and monitor the contention resolution. In some implementations, if the contention resolution is not successful after the MSG3 transmission(s) or retransmission(s), the UE may fall back to an MSG1 transmission.

In some implementations, the MSGA of the 2-step RA type may include a preamble on a PRACH and a payload on a PUSCH. After the MSGA transmission, a UE may monitor for a response from a network within a configured window. For CFRA, a dedicated preamble and a PUSCH resource may be configured for an MSGA transmission, and upon receiving a network response, the UE may end the RA procedure. For CBRA, if contention resolution is successful upon receiving the network response, the UE may end the RA procedure. Meanwhile, if a fallback indication is received in an MSGB, the UE may perform the MSG3 transmission using a UL grant scheduled in the fallback indication and monitor the contention resolution. In some implementations, if the contention resolution is not successful after an MSG3 transmission(s) or retransmission(s), the UE may fall back to an MSGA transmission. In some implementations, if the RA procedure with the 2-step RA type is not completed after a specific number of MSGA transmissions, the UE may be configured to switch to CBRA with the 4-step RA type.

In some implementations of the present disclosure, with regard to configured grants (CGs), the gNB(s) may allocate uplink resources for an initial HARQ transmission to the UEs. Two types of configured uplink grants, e.g., Type 1 and Type 2, may be defined. In some implementations, with regard to Type 1 (e.g., CG type 1), the RRC layer may directly provide the configured uplink grant (e.g., including the periodicity). With regard to Type 2 (e.g., CG type 2), the RRC layer may define the periodicity of the configured uplink grant while a PDCCH addressed to a CS-RNTI may either signal and activate the configured uplink grant, or deactivate the configured uplink grant. For example, a PDCCH addressed to a CS-RNTI may indicate that the uplink grant may be implicitly reused according to the periodicity defined by the RRC, until deactivated.

In some implementations, when the CG Type 1 is configured, a NW and/or an RRC may configure parameters, such as a CS-RNTI for retransmission, periodicity of a configured grant Type 1, an offset (e.g., timeDomainOffset) of a resource with respect to SFN=0 in time domain, an allocation (e.g., timeDomainAllocation) of a configured uplink grant in time domain, which contains startSymbolAndLength (e.g., SLIV in 3GPP TS 38.214), and a number (e.g., nrofHARQ-Processes) of HARQ processes for configured grant.

In some implementations, upon configuration of a CG Type 1 for a serving cell (SC) by upper layers, a UE (e.g., a MAC entity of the UE) may store an uplink grant provided by the upper layers as a configured uplink grant (e.g., for the indicated SC) and/or initialize or re-initialize the configured uplink grant to start in a symbol according to a timeDomainOffset and S (e.g., derived from SLIV as specified in 3GPP TS 38.214) and to reoccur with periodicity.

FIG. 1 is a schematic diagram illustrating a process 100 performed by a UE for monitoring the PDCCH during an SDT procedure 108, according to an example implementation of the present disclosure. It should be noted that although actions in this and other Figures are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations.

In some implementations, a UE may be in an RRC_INACTIVE state when the UE starts the process 100. The UE may be configured with SDT configurations. In some implementations, the configurations for SDT may be configured via an RRC release message (e.g., with suspend configuration). In some implementations, the configuration(s) for SDT may include RACH configuration(s), CG configuration(s), configuration(s) for SRB/DRB used for SDT, etc. In some implementations, after starting the process 100, the UE may receive UL data, in action 104, for transmission (e.g., to a base station). In some implementations, the UL data may be associated with a specific DRB/SRB/LCH.

In some implementations, after receiving the UL data, the UE may determine, at action 106, whether to initiate an SDT procedure 108 or initiate a non-SDT procedure, such as an RRC connection resume procedure 120 (e.g., to initiate the transmission associated with an RRCResumeRequest message). In some implementations, if the UE determines, at action 106, to perform a non-SDT procedure, the UE may perform, at action 120, an RRC connection resume procedure. The procedure 100 may then end.

In some implementations, the UE may determine whether to initiate or trigger the SDT procedure 108 or initiate the RRC connection resume procedure 120 based on one or more criteria (e.g., DRB/SRB, data volume, and/or RSRP, etc.). In some implementations, if the one or more criteria for initiating the SDT procedure is not satisfied, or a non-SDT procedure is initiated, the UE may initiate the RRC connection resume procedure 120 (e.g., the UE may initiate transmission of data associated with an RRCResumeRequest message).

As described above, after receiving the UL data, the UE may determine to perform the SDT procedure 108. In some implementations, the UE may determine to initiate the SDT procedure 108 when or after at least one of LCH/DRB/SRB that is configured for SDT has pending data (e.g., when the data is available for transmission for only LCHs/DRBs/SRBs for which the SDT is enabled). The LCH/DRB/SRB configured for the SDT may be resumed or re-established when the UE initiates the SDT procedure 108. In some implementations, the UE may determine, at action 106, to initiate the SDT procedure 108 if the data volume for transmission (e.g., for SDT) is lower than a configured threshold for SDT. The data volume may only include the volume of data for the LCH/DRB/SRB that is configured for SDT. In some implementations, the UE may determine to initiate the SDT procedure 108 if an RSRP is larger than a configured RSRP threshold for SDT.

In some implementations, if the UE determines, at action 106, to initiate the SDT procedure 108, the UE may further perform, at action 110, a UL carrier selection (e.g., select either a UL or an SUL). In some implementations, if a supplementary uplink (SUL) is configured in the cell, the UL carrier may be selected based on an RSRP threshold. In some implementations, after the UL carrier selection in action 110, the UE may perform the SDT procedure 108 on the selected UL carrier (e.g., either a UL or an SUL).

In some implementations, after the SDT procedure 108 is performed on the selected UL carrier, the UE may determine, at action 112, whether a valid CG is configured to the UE and/or whether a configured CG resource is valid (e.g., during the SDT procedure 108) based on one or more criteria.

In some implementations, one criterion for determining whether a valid CG exists, in action 112, is based on whether an associated beam/SSB is valid. In some implementations, whether the associated beam/SSB is valid may be based on an RSRP threshold. The RSRP threshold may be configured in the RRC release message and/or the CG configuration The RSRP threshold may be indicated by an IE cg-SDT-RSRP-ThresholdSSB. In some implementations, if there is at least one beam/SSB with an RSRP that is above the RSRP threshold, the UE may consider the CG resource/configuration to be valid. In some implementations, if there is no beam with an RSRP that is above the RSRP threshold, the UE may consider the CG resource/configuration to be invalid.

In some implementations, another criterion before determining whether the CG is valid may be based on whether a timing advance/alignment (TA) is valid. For example, the UE may determine the CG resource/configuration to be valid if the TA is valid. In some implementations, if the TA is invalid, the UE may consider the CG resource/configuration to be invalid. In some implementations, whether a TA is valid may be based on a TA timer. For example, the UE may consider the TA to be valid if the TA timer is running. Conversely, the UE may consider the TA to be invalid if the TA timer is not running. In some implementations, the TA timer (e.g., parameter of the timer) may be configured in the RRC release message and/or the CG configuration. In some implementations, whether a TA is valid may be based on an RSRP change volume and/or a configured threshold (e.g., cg-SDT-RSRP-ChangeThreshold). For example, the UE may consider the TA to be invalid if the change in RSRP is higher than a threshold. In some implementations, the threshold (e.g., for the change in RSRP) may be configured in the RRC release message and/or the CG configuration. For example, the UE may consider the TA to be valid if compared to the downlink pathloss reference RSRP value when the MAC entity last resets, the RSRP has not increased/decreased by more than the threshold.

In some implementations, another criterion to determine whether the CG is valid may be based on whether a CG resource configuration is valid. In some implementations, when the CG resource configuration is initialized or reinitialized, the CG resource configuration may be deemed to be valid. In some implementations, when the CG resource configuration is released or suspended, the CG resource configuration may be considered to be invalid. In some implementations, the CG resource configuration may be configured in the RRC release message.

In some implementations, another criterion to determine whether the CG is valid may be based on whether data is available for transmission, for example, for only those DRBs/SRBs/LCHs for which the SDT is enabled. In some implementations, the UE may be configured with one or more DRBs/SRBs/LCHs specifically for SDT.

In some implementations, another criterion to determine whether the CG is valid may be based on whether an RSRP is larger than the configured RSRP threshold for SDT. In some implementations, the RSRP threshold may be configured in the RRC release message and/or the CG configuration.

In some implementations, another criterion to determine whether the CG is valid may be based on whether the data volume for transmission is lower than a configured threshold for SDT. In some implementations, the configured threshold may be configured in the RRC release message and/or the CG configuration.

In some implementations, another criterion to determine whether the CG is valid may be based on an indication (e.g., an explicit or implicit indication) received from a NW. In some implementations, the indication may indicate that a CG (e.g., associated with a beam) is valid or invalid. In some implementations, the indication may indicate whether a beam associated with a CG is valid or invalid.

In some implementations, another criterion to determine whether the CG is valid may be based on whether a timer (e.g., a T319 or a timer for SDT) is running. In some implementations, the timer may be configured in the RRC release message and/or the CG configuration. In some implementations, the UE may determine that the CG resource/configuration is valid if the timer is running. In some implementations, the UE may determine that the CG resource/configuration is invalid if the timer is not running or when the timer expires. In some implementations, the timer may detect failure of the SDT. In some implementations, the timer may start or restart upon transmission of the UL data when the UE is in an RRC_INACTIVE state.

In some implementations, the timer may start or restart upon transmission of small data. In some implementations, the timer may start or restart upon transmission of an RRC resume request. In some implementations, the timer may stop upon reception of an RRCResume, RRCSetup, RRCRelease, RRCRelease with suspendConfig or RRCReject message, cell re-selection and upon abortion of connection establishment by upper layers. In some implementations, when the timer expires, the UE may determine upon transitioning to an RRC_IDLE (e.g., with a specific RRC resume cause) state.

In some implementations, two types of SDT procedures 108, an RA-based SDT procedure, and a CG-based SDT procedure, may be implemented based on the determination on whether the CG is valid or invalid (in action 112). In some implementations, the UE may transmit the small data, via an MSG3, MSGA, CG resource, and/or PUSCH resource during the SDT procedure 108.

In some implementations, if the UE determines, in action 112, that the CG is invalid, for example, when one of the above-described criteria for CG validity is not satisfied, the UE may perform, in action 114, an RA-based SDT procedure. In some implementations, the UE may perform the transmission of an RA preamble, e.g., via the preamble/RA resource/PRACH resource that is configured for SDT. In some implementations, the UE may perform a UL transmission (e.g., for small data) via an Msg3/MsgA.

In some implementations, if the UE determines, in action 112, that the CG is valid, for example, one or more of the above-described criteria for CG validity are satisfied, the UE may perform, in action 116, a CG-based SDT procedure. In some implementations, the UE may perform a UL transmission (e.g., for small data) via a CG resource.

Figure 2:
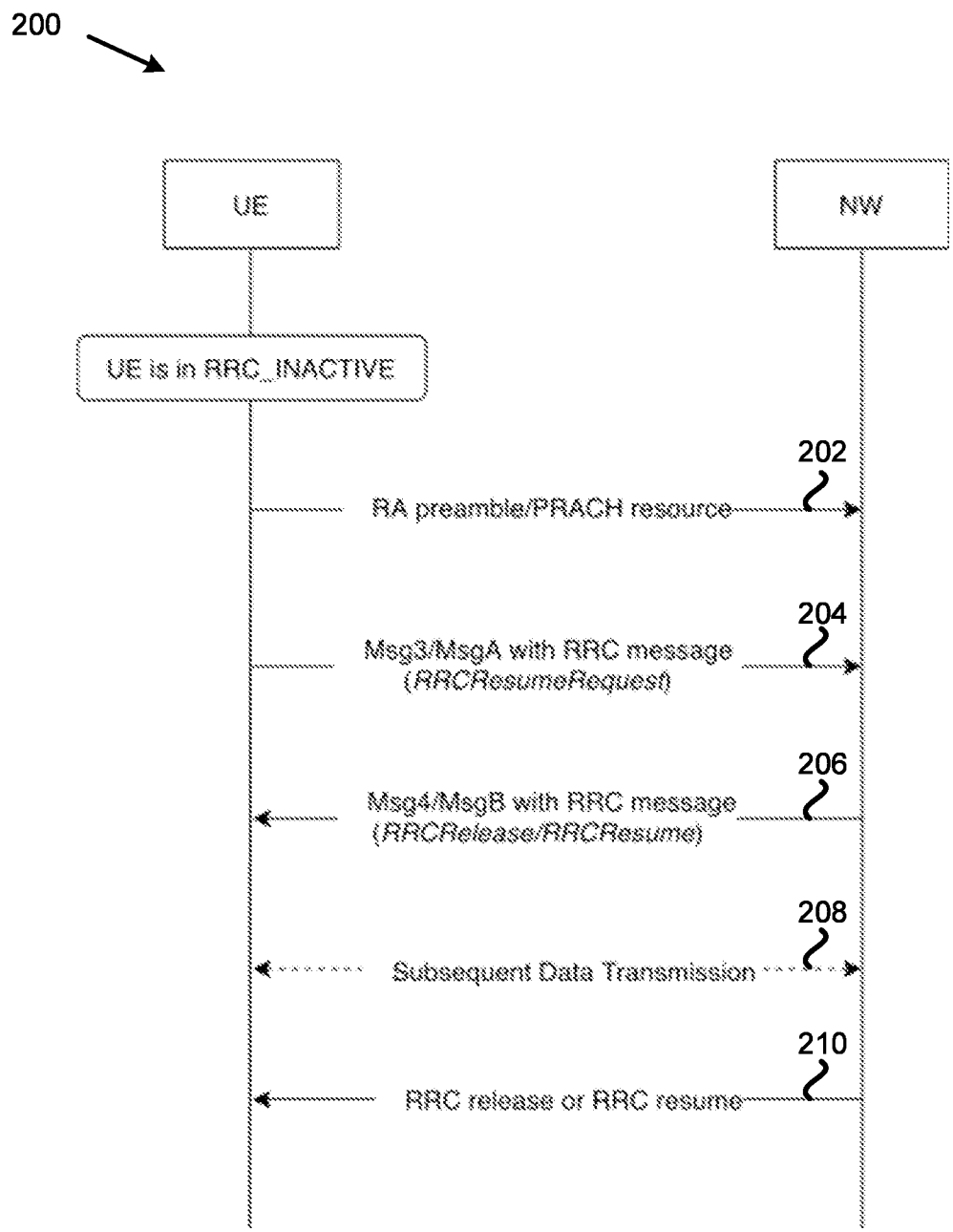
FIG. 2 is a schematic diagram illustrating an RA-based SDT procedure, according to an example implementation of the present disclosure.

In some implementations, after the UE performs the RA-based SDT or the CG-based SDT, the SDT procedure 108 may end, terminate, stop, or be completed. In some implementations, ending/termination/stoppage/completion of the SDT procedure 108 may be indicated by an indication received from the NW (e.g., receiving an RRC release message), by a timer (e.g., a T319, a timer for SDT, etc.), a counter (e.g., a retransmission counter), and/or by occurrence of a specific event (e.g., when the UE performs cell (re)selection). FIG. 2 is a schematic diagram 200 illustrating an RA-based SDT procedure, according to an example implementation of the present disclosure. It should be noted that although actions in this and other Figures are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations.

In some implementations, when a UE is in an RRC_INACTIVE state and has UL data available for transmission and/or an SDT procedure has been initiated, the UE may initiate an RA-based SDT procedure for the transmission of the UL data (e.g., in a case that the CG is considered as invalid). In some implementations, the UE may select either a 4-step RA type or a 2-step RA type procedure. In some implementations, a preamble/PRACH resource for the RA-based SDT procedure (e.g., an RA preamble/PRACH resource with a small data indication) and a normal RA procedure (e.g., an RA preamble without any small data indication) may be different. In action 202, while the UE is in an RRC_INACTIVE state, it may select the preamble/PRACH resource for the RA-based SDT procedure for transmission of the preamble to a NW.

In some implementations, after transmitting the RA preamble to the NW, the UE may transmit, in action 204, an RRC message, MAC CE(s), and/or UL data through an MSG3 (e.g., when the 4-step RA type is selected) or an MSGA (e.g., when the 2-step RA type is selected) to the NW. In some implementations, the RRC message may be an RRCResumeRequest message. In addition to the RRC message, a MAC CE (e.g., a BSR) and UL data (e.g., data associated with a DRB(s) for SDT) may be included in the MSG3/MSGA in some implementations.

In some implementations, once the MSG3/MSGA is transmitted, the UE may monitor, for example, a temporary C-RNTI/C-RNTI/RA-RNTI/MSGB-RNTI, for an MSG4/MSGB, in which a contention resolution ID may be carried. In some implementations, the NW may transmit, in action 206, an RRC message in an MSG4/MSGB to the UE. In some implementations, the RRC message may be an RRCRelease message (e.g., with a suspendConfig IE) or an RRCResume message. In some implementations, the UE may stay in an RRC_INACTIVE state if the UE receives the RRCRelease message (e.g., with the suspendConfig IE) or the UE may enter an RRC_CONNECTED state if the UE receives the RRCResume message.

In some implementations, once the RA procedure for SDT is successfully completed and/or until the RA-based SDT is terminated/completed, the UE may monitor a specific RNTI (e.g., a C-RNTI) for subsequent data transmissions in action 208. In some implementations, subsequent data transmissions may include the transmission of multiple UL and/or DL data packets as part of the SDT procedure and without transitioning to an RRC_CONNECTED state (e.g., while the UE is still in the RRC_INACTIVE state). In some implementations, the UE may monitor the PDCCH via a specific RNTI (e.g., a C-RNTI) to receive dynamic scheduling for a UL and/or a new DL transmission and/or a corresponding retransmission.

In some implementations, after monitoring for any possible subsequent data transmission, the NW may send, in action 210, an RRC release (e.g., with a suspendconfig IE) message to keep the UE in the RRC_INACTIVE state or to move the UE to an RRC_IDLE state. In other implementations, the NW may send, in action 210, an RRC resume message to move the UE to an RRC_CONNECTED state. In some implementations, once the RRCRelease message (e.g., with the suspendConfig IE) is received, the UE may terminate the SDT procedure based on the RRCRelease message, and/or stop monitoring the C-RNTI, and/or stay in the RRC_INACTIVE state.

Figure 3:
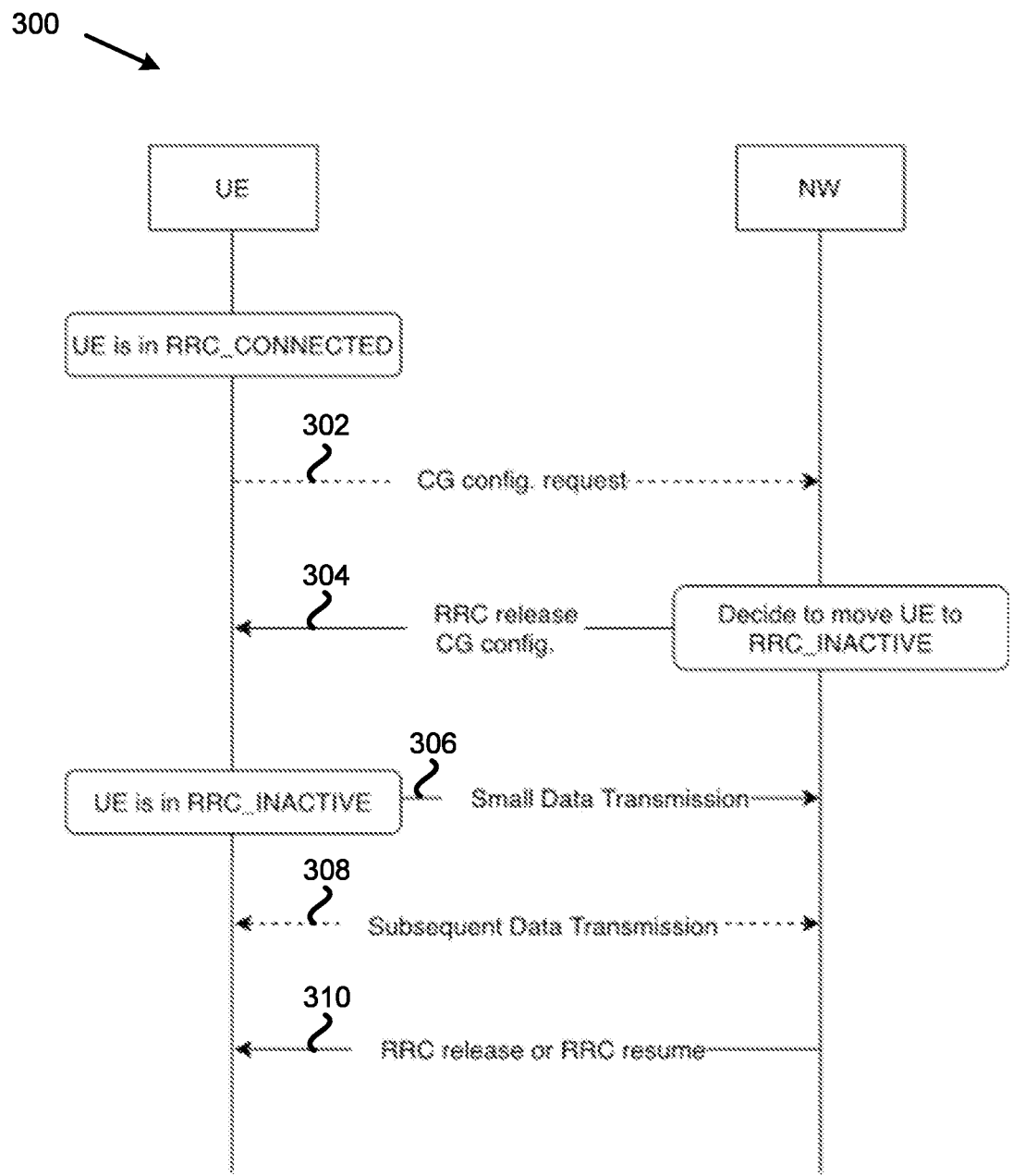
FIG. 3 is a schematic diagram illustrating a CG-based SDT procedure, according to an example implementation of the present disclosure.

FIG. 3 is a schematic diagram 300 illustrating a CG-based SDT procedure, according to an example implementation of the present disclosure. It should be noted that although actions in this and other Figures are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations.

In some implementations, when a UE is in an RRC_CONNECTED state and/or an RRC_INACTIVE state, the UE may initiate a CG-based SDT procedure. In some implementations, a UE, that is in an RRC_CONNECTED stat, may send, in action 302, a CG configuration request to a NW to indicate the UE's preference on CG configuration for small data transmission and/or for an RRC_INACTIVE state.

In some implementations, after receiving the CG configuration request, the NW may move, in action 304, the UE to an RRC_INACTIVE state by sending an RRCRelease message (e.g., including a suspendconfig IE) to the UE. In some implementations, the RRCRelease message may include at least a CG configuration to configure the CG resources to the UE. In some implementations, the CG configuration may include but not limited to the followings: a CG periodicity, a TBS, a number for implicit release of the CG resources, a CG Timer, a retransmission timer, a number of HARQ processes reserved for CG in SDT, an RSRP threshold for SSB selection and association between an SSB and CG resources, TA related parameters (e.g., a TA timer), etc.

In some implementations, after receiving the RRCRelease message and transitioning to an RRC_INACTIVE state, the UE may perform, in action 306, an SDT procedure based on the CG resources according to the CG configuration (e.g., configured in action 304). For example, the UE may transmit UL data (e.g., small data) via the CG resource(s) (e.g., during the SDT procedure).

In some implementations, after performing the SDT procedure and/or after an initial transmission for the CG-based SDT procedure, and/or until the CG-based SDT procedure is terminated/completed, the UE and NW may, in action 308, perform subsequent data transmissions. In some implementations, subsequent data transmissions may include the transmission of multiple UL and/or DL packets as part of the SDT procedure and without transitioning to an RRC_CONNECTED state (e.g., the UE is still in an RRC_INACTIVE state). In some implementations, the UE may monitor the PDCCH via a specific RNTI (e.g., a C-RNTI, a CS-RNTI, and/or a specific RNTI) to receive dynamic scheduling for a UL and/or a DL new transmission and/or the corresponding retransmission. In some implementations, the UE may monitor the PDCCH via a UE-specific RNTI (e.g., a C-RNTI, a CS-RNTI, and/or a specific RNTI) to receive dynamic scheduling for the retransmission of a CG. In some implementations, the UE may perform subsequent data transmission via a CG resource(s) according to the CG configuration (e.g., configured in action 304).

In some implementations, after monitoring for any possible subsequent data transmission, the NW may send, in action 310, an RRCRelease message (e.g., with a suspendconfig IE) to keep the UE in the RRC_INACTIVE state or to move the UE to an RRC_IDLE state. In other implementations, the NW may send, in action 310, an RRC resume message to move the UE to an RRC_CONNECTED state. In some implementations, once the RRCRelease message (e.g., with the suspendConfig IE) is received, the UE may terminate the SDT procedure based on the RRCRelease message, and/or stop monitoring the C-RNTI, and/or stay in an RRC_INACTIVE state.

Figure 4A:
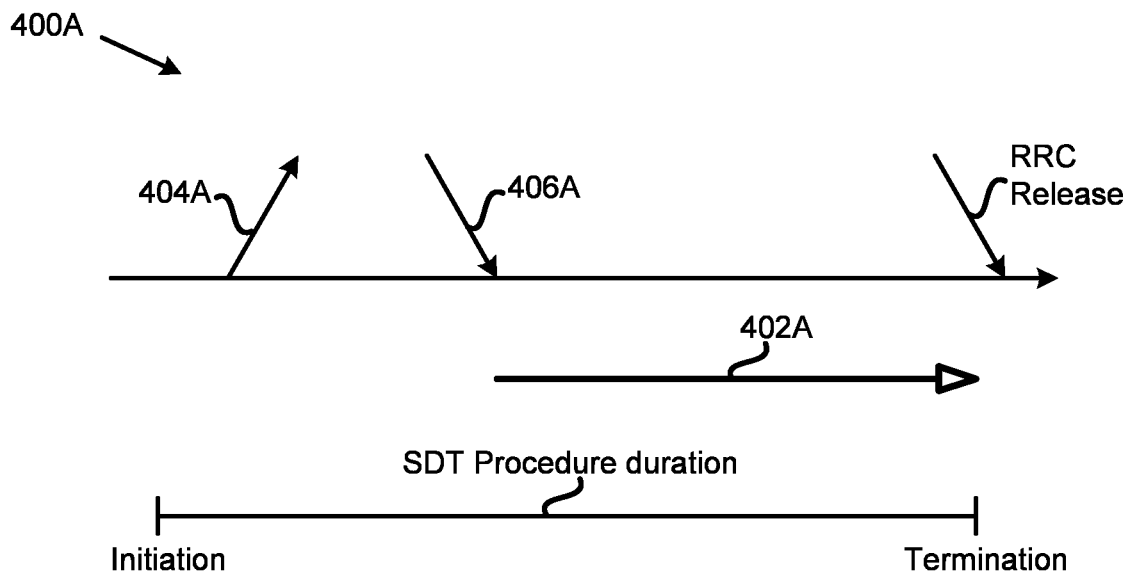
FIGS. 4A and 4B are schematic diagrams illustrating examples of an SDT period associated with an SDT procedure, according to an example implementation of the present disclosure.
Figure 4B:
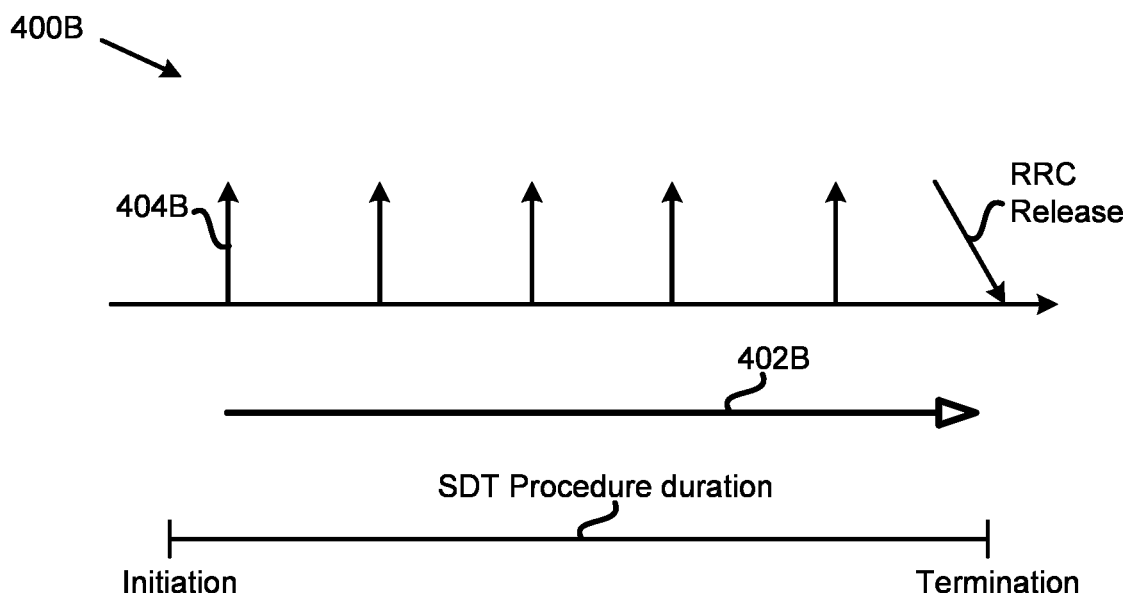

FIGS. 4A and 4B are schematic diagrams illustrating examples of an SDT transmission period of an SDT procedure, according to an example implementation of the present disclosure. A duration of an SDT transmission period (e.g., may be also referred as a subsequent transmission period in some embodiments) may be implemented as follows. In some implementations, an SDT/subsequent transmission period may be a time period during an SDT procedure (e.g., an RA-based SDT procedure 400A in FIG. 4A and/or a CG-based SDT procedure 400B in FIG. 4B). In some implementations, the SDT/subsequent transmission period may be a time period during which the SDT procedure is ongoing. In some implementations, the SDT/subsequent transmission period may start when or after the UE initiates an SDT procedure. In some implementations, the RA procedure may be an RA-based SDT procedure 400A in FIG. 4A. In some implementations, the RA procedure may be initiated for SDT.

In some implementations, an SDT transmission period 402A in the RA-based SDT procedure 400A may start when or after a UE considers a contention resolution to be successful for an RA procedure and/or after the UE considers the RA procedure to have successfully completed (e.g., the UE sends a UL message 404A, such as an MSG3 or an MSGA, to a NW and receives a response 406A, such as an MSG4 or an MSGB, from the NW).

In some implementations, an SDT transmission period may be a time period while a CG configuration is configured/initiated (e.g., and the CG configuration is not released). In some implementations, the SDT transmission period may start when or after the CG configuration is configured/initialized/(re-)initialized. In some implementations, the CG configuration may have a certain index, e.g., the lowest index among multiple configurations, the largest index among multiple configurations, and a specific index which is dedicatedly configured for the SDT procedure. In some implementations, the CG configuration may contain a parameter which is used to indicate SDT scheduling. In some implementations, the SDT transmission period may start when or after the CG configuration is considered as valid.

In some implementations, an SDT transmission period 402B in the CG-based SDT procedure 400B may start when or after a UE transmits a UL message (e.g., a UL message 404B transmitted by the UE).

In some implementations, the UL message may be transmitted via an MSG1/MSG3/MSGA/CG resource/UL resource scheduled by an MSG2/MSGB/MSG4 (e.g., during the SDT procedure) or on the UL resource being pre-configured or configured as part of an SDT configuration. In some implementations, the UL message may include an RRC resume request message (e.g., an RRCResumeRequest or an RRCResumeRequest1). In some implementations, the UL message may include small data (e.g., UL data associated with a specific SRB/DRB/LCH for SDT). In some implementations, the UL message may include a MAC CE (e.g., a BSR MAC CE).

In some implementations, the SDT transmission period may start when or after a UE receives a response from the NW. In some implementations, the response may be an Msg2/Msg4/MsgB and/or a response for a UL transmission via the CG resource. In some implementations, the response may be used for contention resolution (e.g., for an RA procedure). In some implementations, the response may include an ACK/NACK (e.g., HARQ/RRC) message, such as for a UL transmission via the CG resource. In some implementations, the response may contain a UL grant/DL assignment for a new transmission/retransmission. In some implementations, the response may be a PDCCH addressed to an RNTI (e.g., a C-RNTI, a CS-RNTI, a dedicated RNTI, an RNTI for SDT, and/or an RNTI for a CG). In some implementations, the response may indicate a UL grant for a new transmission for the HARQ process used for the transmission of a UL transmission for small data (e.g., a UL message). In some implementations, the response may include a specific command (e.g., a TA command MAC CE). In some implementations, the response may include a message such as an RRCResume, RRCSetup, RRCRelease, RRCRelease with SuspendConfig, RRCReestablishment, and/or RRCReject, etc.

In some implementations, the SDT transmission period may start when or after a UE receives an indication from a NW. In some implementations, the indication (with a specific value, e.g., TRUE or FALSE) may be included in a broadcast system information (e.g., SIB) to indicate that CG transmission for the UE that is in an RRC_INACTIVE state is supported in the cell.

In some implementations, the SDT transmission period and/or the SDT procedure may be terminated/stopped when or after the SDT procedure is terminated. In some implementations, the SDT transmission period and/or the SDT procedure may be terminated/stopped when or after the CG configuration is released/suspended/cleared. In some implementations, the SDT transmission period and/or the SDT procedure may be terminated/stopped when or after the CG configuration is considered as invalid.

In some implementations, the SDT transmission period and/or the SDT procedure may be terminated/stopped when or after a UE receives an indication from a NW. In some implementations, the indication may include a message such as an RRCResume, RRCSetup, RRCRelease, RRCRelease with SuspendConfig, RRCReestablishment, and/or RRCReject, etc. The indication may be a PDCCH addressed to an RNTI (e.g., a C-RNTI, a CS-RNTI, a dedicated RNTI, an RNTI for SDT, and/or an RNTI for a CG). In some implementations, the indication may indicate to the UE to terminate the SDT procedure and/or the SDT transmission period (e.g., based on a field of the indication). In some implementations, the indication may indicate to the UE to initiate an RRC procedure (e.g., an RRC connection resume procedure, an RRC establishment procedure, and/or an RRC reestablishment procedure). In some implementations, the indication may indicate to the UE to switch/fallback the types of SDT, e.g., the types may be an RA-based SDT, a CG-based SDT, a 2-step RA, a 4-step RA, etc. In some implementations, the indication (with a specific value, e.g., TRUE or FALSE) may be included in a system information (e.g., SIB) to indicate that CG transmission for the UE in an RRC_INACTIVE state is no longer supported in the cell. For example, when the UE receives the indication (with a specific value, e.g., TRUE or FALSE), the UE may release/suspend the CG configuration(s).

In some implementations, the SDT transmission period and/or the SDT procedure may be terminated/stopped when or after a timer/window expires. In some implementations, the timer/window may be an SDT failure/problem detection timer. In some implementations, the timer/window may be specifically configured for SDT. In some implementations, the value of the timer/window may be configured via an RRC release message. In some implementations, the value of the timer/window may be configured via an RRC release message with a "suspend" configuration. In some implementations, the value of the timer/window may be configured via a configuration for an SDT. In some implementations, the value of the timer/window may be configured via a RACH configuration for an SDT. In some implementations, the value of the timer/window may be configured via a CG configuration for an SDT. In some implementations, the value of the timer/window may be configured via an IE UE-TimersAndConstants. In some implementations, the value of the timer/window may be configured via a system information (e.g., a SIB).

In some implementations, the timer/window may be a TA timer, ra-Response Window, msgB-Response Window, ra-ContentionResolutionTimer, configuredGrantTimer, cg-Retransmission Timer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or new Tx. In some implementations, the timer/window may be used for monitoring a response (e.g., for an ACK/NACK). The timer/window may be a response window. In some implementations, the timer/window may be used for receiving a PDCCH/scheduling (e.g., for new transmission or retransmission) from a NW.

In some implementations, the SDT transmission period may be terminated/stopped when or after a UE enters an RRC_IDLE state or an RRC_CONNECTED state (e.g., from the RRC_INACTIVE state). In some implementations, the SDT transmission period may be terminated/stopped/released when or after the UE performs cell selection/reselection. In some implementations, the SDT transmission period may be terminated/stopped upon abortion of connection establishment by upper layers. In some implementations, the SDT transmission period may be terminated/stopped by a RAN notification area (RNA) update. In some implementations, the SDT transmission period may be terminated/stopped when or after the UE establishes/resumes an RRC connection from an RRC_INACTIVE state on a cell different from the cell where the CG configuration was provided. In some implementations, the SDT transmission period may be terminated/stopped when or after the UE initiates an RRC re-establishment procedure. For example, the SDT transmission period may be terminated/stopped after the UE sends an RRCReestablishmentRequest to a NW. In some implementations, the SDT transmission period may be terminated/stopped when or after the UE is indicated, by the NW, to perform carrier switching (e.g., from an NUL to an SUL or vice versa). In some implementations, the SDT transmission period may be terminated/stopped when or after the UE is indicated, by the NW, to perform a BWP switching (e.g., a UL/a DL).

In some implementations, in the SDT transmission period, a UE may need to monitor the PDCCH, e.g., to receive the possible scheduling (e.g., a DL and/or UL) from a NW. In some implementations, the UE may monitor the PDCCH (e.g., during the SDT procedure and/or during the SDT transmission period) based on a search space (SS), a CORESET, and/or an RNTI. For example, the UE may monitor the PDCCH addressed to a C-RNTI after successful completion of the RA procedure for an SDT.

In some implementations, a search space (SS) in the present disclosure may include one or more of the following search spaces. In some implementations, the SS may be a common SS (CSS). In some implementations, the SS may be CSS(s) configured in the IE PDCCH-ConfigCommon In some implementations, the SS may be CSS(s) configured by the IE sdt-SearchSpace. In some implementations, the SS may be a type-1 PDCCH CSS set configured by the IE ra-SearchSpace. In some implementations, the SS may be a type-3 PDCCH CSS set. In some implementations, the SS may be search space zero. In some implementations, the SS may be a new common Search Space set configured via system information (e.g., SIB) or an RRC release message. In some implementations, the SS may be an SS with parameters of the SS(s) configured in the initial BWP.

In some implementations, the SS may be a UE-specific SS set. In some implementations, the SS may be a UE-specific SS set configured via an RRC Release message. In some implementations, the SS may be a UE-specific Search Space set configured via an Msg4/MsgB. In some implementations, the SS may be a UE-specific SS set configured via an IE PDCCH-Config. In some implementations, the SS may be USS(s) configured by the IE sdt-CG-SearchSpace. In some implementations, the SS may be USS(s) configured in a CG configuration for SDT. In some implementations, the SS may be USS(s) configured in a BWP configured dedicated for SDT. In some implementations, the SS may be a UE-specific SS set configured via configuration(s) for SDT. In some implementations, the SS may be a search space with an ID other than 0-39. In some implementations, the SS may be an SS set identified as specific search space set for SDT.

In some implementations, a CORESET mentioned in the present disclosure may include one or more of the following CORESETs. In some implementations, the CORESET may be a common CORESET. In some implementations, the CORESET may be a CORESET 0. In some implementations, the CORESET may be a CORESET other than CORESET 0. In some implementations, the CORESET may be a UE-specific CORESET configuration. In some implementations, the CORESET may be a UE-specific CORESET configured via an RRC Release message. In some implementations, the CORESET may be a UE-specific CORESET configured via an Msg4/MsgB. In some implementations, the CORESET may be a UE-specific CORESET configured via configuration(s) for SDT. In some implementations, the CORESET may be a CORESET with an ID other than 0-14.

In some implementations, an RNTI mentioned in the present disclosure may be a C-RNTI, a CS-RNTI, an RNTI for SDT, an RNTI for CG, and/or a new RNTI other than SI-RNTI, RA-RNTI, MsgB-RNTI, TC-RNTI, P-RNTI, INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI(s), PS-RNTI, SL-RNTI, SL-CS-RNTI, and SL Semi-Persistent Scheduling V-RNTI.

In some implementations, under different conditions, a UE may monitor a PDCCH based on different SSs, CORESETs, and/or RNTIs. The different SSs, CORESETs, and/or RNTIs may be configured by different configurations and/or signaling. In some implementations, the different configurations may be configured for SDT, an RA configuration, a CG configuration, etc. In some implementations, the different signaling may be a system information (e.g., SIB), an RRC release message, an RRC reconfiguration message, etc. In some implementations, the UE may monitor the PDCCH based on a first SS (e.g., a common SS), a first CORESET, a first RNTI for an RA-based SDT. In some implementations, the UE may monitor the PDCCH based on a second SS (e.g., a UE-Specific SS), a second CORESET, a second RNTI for CG-based SDT. In some implementations, the UE may monitor the PDCCH based on a first SS, a first CORESET, a first RNTI for new transmission. In some implementations, the UE may monitor the PDCCH based on a second SS, a second CORESET, a second RNTI for retransmission.

Figure 5:
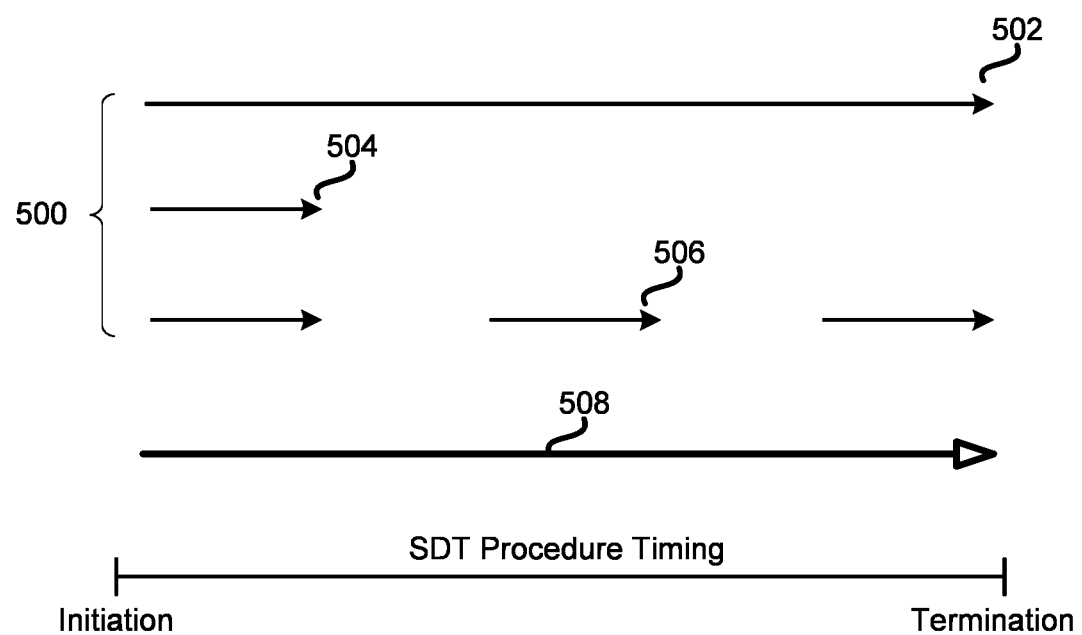
FIG. 5 is a schematic diagram illustrating PDCCH monitoring alternatives, according to an example implementation of the present disclosure.

In some implementations, PDCCH monitoring behaviors for SDT are defined, such as how and/or when to monitor PDCCH during an SDT procedure. FIG. 5 is a schematic diagram illustrating PDCCH monitoring alternatives 500, according to an example implementation of the present disclosure. The PDCCH monitoring alternatives may be applied during an SDT procedure and/or an SDT transmission period and based on a search space, a CORESET, and/or an RNTI. The alternatives may be implemented independently and/or separately to form a specific method. Any two or more than two of the following alternatives described herein may be combined logically, reasonably, and/or properly to form a specific method.

In some implementations, an event-based PDCCH monitoring alternative 502 may be applied during an SDT transmission period 508 in which the UE may monitor a PDCCH during the (e.g., an RA-based and/or a CG-based) SDT procedure and/or during the SDT transmission period based on a search space, a CORESET, and/or an RNTI. In some implementations, the UE may keep monitoring the PDCCH during the SDT procedure and/or the SDT transmission period based on a search space, a CORESET, and/or an RNTI. In some implementations, the UE may not stop monitoring the PDCCH during the SDT procedure and/or the SDT transmission period based on a search space, a CORESET, and/or an RNTI (e.g., until the condition(s) for PDCCH monitoring termination is satisfied).

In some implementations, a UE may monitor a PDCCH when a (e.g., the RA-based and/or the CG-based) SDT procedure is ongoing. More specifically, the UE may monitor the PDCCH when an RA procedure (e.g., for SDT) is ongoing. In some implementations, the UE may monitor the PDCCH after a CG configuration is configured/initiated. For example, the CG configuration may be configured in an RRC release message, and the UE may monitor the PDCCH after receiving the CG configuration in the RRC release message. In some implementations, the UE may monitor the PDCCH when or after the CG resource/configuration is considered as valid. In some implementations, the UE may monitor the PDCCH after the UE initiates an SDT procedure.

In some implementations, a UE may monitor a PDCCH after the UE considers a contention resolution to be successful for an RA procedure and/or after the UE considers the RA procedure to be successfully completed. In some implementations, a UE may monitor a PDCCH until a RA-SDT procedure is terminated. In some implementations, the RA procedure may be an RA-based SDT procedure.

In some implementations, the RA procedure may be initiated for SDT. In some implementations, a UE may monitor a PDCCH after the UE transmits a UL message. In some implementations, the UL message may be transmitted via an Msg1/Msg3/MsgA/CG resource/UL resource scheduled by an Msg2/MsgB/Msg4 (e.g., during the SDT procedure). In some implementations, the UL message may include an RRC resume request message (e.g., RRCResumeRequest or RRCResumeRequest1). In some implementations, the UL message may include small data (e.g., UL data associated with a specific SRB/DRB/LCH for SDT). In some implementations, the UL message may include a MAC CE (e.g., BSR MAC CE). In some implementations, if RA-SDT is selected and after the RA procedure is successfully completed, the UE may monitor the PDCCH addressed to C-RNTI until the RA-SDT procedure is terminated. If CG-SDT is selected and after the initial transmission for CG-SDT is performed, the UE may monitor the PDCCH addressed to C-RNTI and CS-RNTI until the CG-SDT procedure is terminated.

In some implementations, the UE may monitor the PDCCH after the UE finishes transmitting the UL message. In some implementations, the UE may or may not monitor the PDCCH within a specified duration after starting to transmit the UL message. In some implementations, the duration may be based on the processing capability of the UE.

In some implementations, a UE may monitor a PDCCH after the UE receives a response from the NW. In some implementations, the response may be an Msg2/Msg4/MsgB and/or a response for a UL transmission via the CG resource. In some implementations, the response may be used for contention resolution, e.g., for an RA procedure. In some implementations, the response may include an ACK/NACK, e.g., for a UL transmission via the CG resource. In some implementations, the response may contain a UL grant/DL assignment for a new transmission/retransmission. The response may be a PDCCH addressed to an RNTI (e.g., a C-RNTI, a CS-RNTI, a dedicated RNTI, an RNTI for an SDT, and/or an RNTI for a CG). In some implementations, the response may indicate a UL grant for a new transmission for the HARQ process used for the transmission of a UL transmission for small data (e.g., the UL message). In some implementations, the response may include a specific command, e.g., a TA command MAC CE. In some implementations, the response may be a message such as an RRCResume, RRCSetup, RRCRelease, RRCRelease with SuspendConfig, RRCReestablishment, and/or RRCReject, etc.

In some implementations, a timer/window-based PDCCH monitoring alternative 504 may be applied during an SDT transmission period 508 in which a UE may monitor a PDCCH while a timer/window is running based on a search space, a CORESET, and/or an RNTI. In some implementations, the UE may keep monitoring the PDCCH while a timer/window is running based on a search space, a CORESET, and/or an RNTI. In some implementations, the UE may not stop monitoring the PDCCH while a timer/window is running based on a search space, a CORESET, and/or an RNTI. In some implementations, the UE may monitor the PDCCH while the timer/window is running regardless of the possible occurrence of a measurement gap.

In some implementations, the timer/window may be an SDT failure/problem detection timer. In some implementations, the timer/window may be specifically configured for SDT. In some implementations, the value of the timer/window may be configured via an RRC release message. In some implementations, the value of the timer/window may be configured via an RRC release message with suspend configuration. In some implementations, the value of the timer/window may be configured via a configuration for SDT. In some implementations, the value of the timer/window may be configured via a RACH configuration for SDT. In some implementations, the value of the timer/window may be configured via a CG configuration for SDT. In some implementations, the value of the timer/window may be configured via an IE UE-TimersAndConstants. In some implementations, the value of the timer/window may be configured via a system information (e.g., a SIB).

In some implementations, the timer/window may be a TA timer, ra-Response Window, msgB-Response Window, ra-ContentionResolutionTimer, configuredGrantTimer, cg-Retransmission Timer, drx-onDurationTimer, drx-InactivityTimer, drx-RetransmissionTimerDE drx-RetransmissionTimerUL, T300, T301, T302, T304, T310, T311, T312, T316, T319, T320, T321, T322, T325, T330, T331, T342, and/or T345.

In some implementations, the timer/window may be used for monitoring a response (e.g., for an ACK/NACK). The timer/window may be a response window. In some implementations, the timer/window may be used for receiving a PDCCH/scheduling (e.g., for new transmission or retransmission) from a NW. In some implementations, the timer/window may be started or restarted when a UE receives an RRC release message (e.g., with suspend configuration.) The RRC release message may include a configuration(s) for SDT. In some implementations, the timer/window may be started or restarted when the SDT procedure is initiated. In some implementations, the timer/window may be started or restarted when the RA procedure is initiated. In some implementations, the timer/window (e.g., for one or multiple or all CG configuration(s)) may be started or restarted when a CG configuration (e.g., that corresponds to the timer/window) is initialized. In some implementations, the timer/window may be started or restarted when the SDT transmission period starts.

In some implementations, the timer/window may be started or restarted when a UE transmits or retransmits a UL message. In some implementations, the UL message may be transmitted via an Msg1/Msg3/MsgA/CG resource/UL resource scheduled by an Msg2/MsgB/Msg4 (e.g., during the SDT procedure). In some implementations, the UL message may include an RRC resume request message (e.g., RRCResumeRequest or RRCResumeRequest1). In some implementations, the UL message may include small data (e.g., UL data associated with a specific SRB/DRB/LCH for SDT). In some implementations, the UL message may include a MAC CE (e.g., BSR MAC CE). In some implementations, if the UL message is transmitted or retransmitted based on a CG resource/configuration, the timer/window that corresponds to the CG configuration may be started or restarted. In some implementations, if the UL message is transmitted on a UL resource scheduled by a dynamic grant, and the dynamic grant is used for retransmission of a HARQ process that was used for transmitting an UL data via CG resource, the timer/window that corresponds to the CG configuration may be started or restarted.

In some implementations, the timer/window may be started or restarted when a UE receives a response from a NW. In some implementations, the response may be an Msg2/Msg4/MsgB and/or a response for a UL transmission via the CG resource. In some implementations, the response may be used for contention resolution, e.g., for an RA procedure. In some implementations, the response may include an ACK/NACK, e.g., for a UL transmission via the CG resource. In this case, the timer/window corresponds to the CG configuration of the CG resource may be started or restarted. In some implementations, the response may contain a UL grant/DL assignment for a new transmission/retransmission. In some implementations, the response may be a PDCCH addressed to an RNTI (e.g., a C-RNTI, a CS-RNTI, a dedicated RNTI, an RNTI for an SDT, and/or an RNTI for a CG). In this case, if the UL grant/DL assignment is for indicating a retransmission of a HARQ process that was used for transmitting UL data via CG resource, the timer/window that corresponds to the CG configuration may be started or restarted. In some implementations, the response may indicate a UL grant for a new transmission for the HARQ process used for the transmission of a UL transmission for small data (e.g., the UL message). In some implementations, the response may include a specific command, e.g., a TA command MAC CE. In some implementations, the response may be a message such as an RRCResume, RRCSetup, RRCRelease, RRCRelease with SuspendConfig, RRCReestablishment, and/or RRCReject, etc.

In some implementations, the timer/window may be started or restarted when a UE receives a PDCCH, for example, addressed to an RNTI (e.g., a C-RNTI, a CS-RNTI, a dedicated RNTI, an RNTI for an SDT, and/or an RNTI for a CG). In some implementations, the timer/window may be started or restarted when the UE receives a DL assignment, for example, on a PDCCH and/or a DL message/data (e.g., on a PDSCH). In some implementations, the timer/window may be started or restarted when another timer (e.g., a HARQ RTT timer) expires. The other timer may indicate a minimum duration before a DL assignment and/or UL HARQ retransmission grant is expected by the UE (e.g., a MAC entity of the UE). In some implementations, the timer/window may be delayed starting or restarting after a configured offset. The configured offset may indicate a minimum duration before a DL assignment and/or UL HARQ retransmission grant is expected by the UE (e.g., a MAC entity of the UE). In some implementations, the configured offset may also be configured per CG configuration. In some implementations, the timer/window may be stopped when the SDT procedure is terminated. In some implementations, the timer/window may be stopped when the RA procedure is stopped/aborted. In some implementations, the timer/window (e.g., for one or multiple or all CG configuration(s)) may be stopped when the corresponding CG configuration is released/suspended/cleared. In some implementations, the timer/window (e.g., for one or multiple or all CG configuration(s)) may be stopped when the corresponding CG configuration is considered as invalid, for example, when a TAT for the CG configuration expires.

In some implementations, the timer/window may be stopped when a UE receives an indication from a NW. In some implementations, the indication may be a message such as an RRCResume, RRCSetup, RRCRelease, RRCRelease with SuspendConfig, RRCReestablishment, and/or RRCReject, etc. In some implementations, the indication may be a PDCCH addressed to an RNTI (e.g., a C-RNTI, a CS-RNTI, a dedicated RNTI, an RNTI for an SDT, and/or an RNTI for a CG). In some implementations, the indication may indicate to the UE to terminate the SDT procedure and/or the SDT transmission period, for example, based on a field of the indication. In some implementations, the indication may indicate to the UE to initiate an RRC procedure (e.g., an RRC connection resume procedure, RRC establishment procedure, and/or a RC reestablishment procedure). In some implementations, the indication may indicate to the UE to switch/fallback on the types for SDT (e.g., the types may be an RA-based SDT, a CG-based SDT, a 2-step RA, a 4-step RA, etc.).

In some implementations, the timer/window may be stopped when a UE receives a response from a NW. In some implementations, the response may be an Msg2/Msg4/MsgB and/or a response for a UL transmission via the CG resource. In some implementations, the response may be used for contention resolution, e.g., for an RA procedure. In some implementations, the response may include an ACK/NACK, e.g., for a UL transmission via the CG resource. In some implementations, the response may contain a UL grant/DL assignment for a new transmission/retransmission. In some implementations, the response may be a PDCCH addressed to an RNTI (e.g., a C-RNTI, a CS-RNTI, a dedicated RNTI, an RNTI for an SDT, and/or an RNTI for a CG). In some implementations, the response may indicate a UL grant for a new transmission for the HARQ process used for the transmission of a UL transmission for small data (e.g., the UL message). In some implementations, the response may include a specific command (e.g., a TA command MAC CE). In some implementations, the response may be a message such as, an RRCResume, RRCSetup, RRCRelease, RRCRelease with SuspendConfig, RRCReestablishment, and/or RRCReject, etc.

In some implementations, the timer/window may be stopped upon cell selection or re-selection. In some implementations, the timer/window may be stopped upon abortion of connection establishment by upper layers. In some implementations, the timer/window may be stopped upon a RAN notification area (RNA) update. In some implementations, the timer/window may be stopped when a UE changes the serving cell to another cell or when the UE camps on a new (e.g., suitable/acceptable) cell. For example, the timer/window may be stopped when or after the UE establishes/resumes an RRC connection from an RRC_INACTIVE state on a cell different from the cell where the CG configuration was provided. In some implementations, the timer/window may be stopped when the UE initiates an RRC re-establishment procedure. For example, the timer/window may be stopped when the UE sends an RRCReestablishmentRequest to a NW. In some implementations, the timer/window may be stopped when the UE is indicated, by the NW, to perform carrier switching (e.g., from an NUL to an SUL or vice versa). In some implementations, the timer/window may be stopped when the UE is indicated, by the NW, to perform a BWP switching (e.g., a UL/DL).

In some implementations, upon expiry of the timer/window, a UE may enter an RRC_IDLE state. In some implementations, upon expiry of the timer/window, the UE may initiate an RRC establishment procedure, e.g., via an RRCSetupRequest. In some implementations, upon expiry of the timer/window, the UE may initiate an RRC reestablishment procedure, e.g., via an RRCRestablishmentRequest. In some implementations, upon expiry of the timer/window, the UE may initiate an RRC connection resume procedure, e.g., via an RRCResumeRequest. In some implementations, upon expiry of the timer/window, the UE may release/suspend a CG configuration (e.g., that the timer/window corresponds to). In some implementations, upon expiry of the timer/window, the UE may perform retransmission based on a CG resource/configuration (e.g., that the timer/window corresponds to).

In some implementations, an SDT procedure may be for a DRX-based PDCCH monitoring during an SDT transmission period in which a UE (e.g., a MAC entity of the UE) may be configured (e.g., by an RRC) with a functionality and/or a PDCCH monitoring occasion(s) that controls the UE's (e.g., a MAC entity of the UE) PDCCH monitoring activity (e.g., for the UE's (e.g., a MAC entity of the UE) RNTI, for a BWP, and/or for a serving cell).

In some implementations, the RNTI, mentioned in the present disclosure, may be a C-RNTI, a CS-RNTI, an RNTI for an SDT, an RNTI for a CG, and/or a new RNTI other than SI-RNTI, RA-RNTI, MsgB-RNTI, TC-RNTI, P-RNTI, INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI(s), PS-RNTI, SL-RNTI, SL-CS-RNTI, and SL Semi-Persistent Scheduling V-RNTI. In some implementations, the BWP, mentioned in the present disclosure, may be an initial (DL) BWP (e.g., BWP #0) and/or a dedicated (DL)BWP. The dedicated BWP may be configured with an RA configuration for an SDT. The dedicated BWP may be configured with a CG configuration for an SDT. The BWP ID of the dedicated BWP may be configured by an RRC message (e.g., an RRC release message).

In some implementations, a DRX-based PDCCH monitoring alternative 506 in FIG. 5 may be applied during an SDT transmission period 508. The UE may be configured with a functionality (e.g., a DRX operation) that controls the UE's (e.g., a MAC entity of the UE) PDCCH monitoring activity, e.g., for a UE's (e.g., a MAC entity of the UE) RNTI, for a BWP, and/or for a serving cell. During an RRC_INACTIVE state, if the functionality (e.g., a DRX operation) is configured, the UE may be allowed to monitor the PDCCH (e.g., for the UE's (e.g., a MAC entity of the UE) RNTI, for the BWP, and/or for the serving cell) discontinuously using the DRX operation. In some implementations, the functionality may be configured by a configuration. The configuration may be configured based on a configuration for an SDT. In some implementations, the configuration may be configured by a system information (e.g., SIB), an RRC release message (e.g., with a suspend configuration), and/or a dedicated RRC message (e.g., an RRC reconfiguration). In some implementations, the configuration may be a DRX configuration. In some implementations, the configuration may include a DRX cycle. In some implementations, the configuration and/or the parameters/timers of the configuration may, for example only, be applied if the UE is performing the SDT procedure and/or during the SDT transmission period.

In some implementations, the configuration may include one or more parameters. In some implementations, the RRC may control the functionality (e.g., a DRX operation) by configuring one or more parameters. For example, a drx-onDurationTimer, drx-SlotOffset, drx-InactivityTimer, drx-RetransmissionTimerDL, drx-RetransmissionTimerUL, drx-LongCycleStartOffset, drx-ShortCycle, drx-ShortCycleTimer, drx-HARQ-RTT-TimerDL, drx-HARQ-RTT-TimerUL, and/or etc. In some implementations, the parameters may be specifically used for an SDT and/or a UE in an RRC_INACTIVE state. In some implementations, the parameters may be named as a drx-onDurationTimerSDT, drx-SlotOffsetSDT, drx-InactivityTimerSDT, drx-RetransmissionTimerDLSDT, drx-RetransmissionTimerULSDT, drx-LongCycleStartOffsetSDT, drx-ShortCycleSDT, drx-ShortCycleTimerSDT, drx-HARQ-RTT-TimerDLSDT, drx-HARQ-RTT-TimerULSDT, and/or etc. In other implementations, the DRX configuration (e.g., DRX parameters) from an RRC_CONNECTED state may be reused for an SDT of the UE in an RRC_INACTIVE state.

In some implementations, an indication may be included in an RRC Release message to indicate whether the UE could apply the DRX configuration (e.g., DRX parameters) in an RRC_CONNECTED state after the UE entered an RRC_INACTIVE state. In some implementations, at least one of the above timers (e.g., DRX timers) may be stopped when one or more of the following occurs: when the SDT procedure is terminated, when the RA procedure is stopped/aborted, when the CG configuration is released/suspended/cleared, when the CG configuration is considered as invalid, when the UE receives an indication from a NW, and/or when the UE receives a response from a NW.

In some implementations, when the functionality (e.g., a DRX operation) is configured, the Active time (e.g., for a BWP and/or a serving cell) may include the time when one or more of the following occurs. In some implementations, a UE may monitor the PDCCH (e.g., via an RNTI, on a BWP and/or on a serving cell) if the UE is considered to be in an Active Time. In some implementations, the Active time may include the time while a timer/window is running. In some implementations, the timer/window may be a TA timer, ra-Response Window, msgB-Response Window, ra-ContentionResolutionTimer, configuredGrantTimer, cg-Retransmission Timer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, and/or T345. In some implementations, the timer/window may be an SDT failure detection timer. In some implementations, the timer/window may be used for monitoring a response (e.g., for an ACK/NACK) and/or for retransmission scheduling from a NW. In some implementations, the timer/window may be used for an SDT.

In some implementations, a UE may monitor one or more PDCCH occasions per a configured cycle (e.g., a DRX cycle). The PDCCH monitoring occasion may include multiple time slots (e.g., a subframe or an OFDM symbol) in which a PDCCH could be sent. In some implementations, the UE may be configured with one more or parameters (e.g., an SS and/or a CORESET) to derive the PDCCH monitoring occasion(s). The PDCCH monitoring occasion(s) may be derived based on a formula (e.g., specified in a TS). The cycle may be configured by system information (e.g., SIB), an RRC release message (e.g., with a suspend configuration), and/or a dedicated RRC message (e.g., an RRC reconfiguration).

In some implementations, other PDCCH monitoring behaviors for SDT are also defined, such as how to stop/terminate the PDCCH monitoring. In some implementations, a UE may monitor the PDCCH based on at least one of the above-mentioned PDCCH monitoring alternatives (e.g., actions 502, 504, 506 in FIG. 5) until the SDT procedure is terminated. In other words, the UE may stop monitoring the PDCCH if the SDT procedure is terminated. In some implementations, the UE may monitor the PDCCH based on at least one of the above-mentioned PDCCH monitoring alternatives (e.g., actions 502, 504, 506 in FIG. 5) until the RA procedure is completed/stopped/aborted. In other words, the UE may stop monitoring the PDCCH if the RA procedure is completed/stopped/aborted. In some implementations, the UE may monitor the PDCCH based on at least one of the above-mentioned PDCCH monitoring alternatives until the CG configuration is released/suspended/cleared. In other words, the UE may stop monitoring the PDCCH if the CG configuration is released/suspended/cleared. In some implementations, the UE may monitor the PDCCH based on at least one of the above-mentioned PDCCH monitoring alternatives until the CG configuration is considered as invalid (e.g., a TAT for the CG configuration may expire). In other words, the UE may stop monitoring the PDCCH if the CG configuration is considered as invalid. In some implementations, the UE may monitor the PDCCH based on at least one of the above-mentioned PDCCH monitoring alternatives until the CG configuration is deprioritized by a dynamic uplink scheduling (e.g., an uplink grant addressed to a C-RNTI indicates same resource with that for a CG resource(s)).

In some implementations, a UE may monitor the PDCCH based on at least one of the above-mentioned PDCCH monitoring alternatives until a UE receives a response from the NW. In other words, the UE may stop monitoring the PDCCH if/after the UE receives a response from the NW. In some implementations, the response may be an Msg2/Msg4/MsgB and/or a response for a UL transmission via the CG resource. In some implementations, the response may be used for contention resolution (e.g., for an RA procedure). In some implementations, the response may include an ACK/NACK (e.g., for a UL transmission via the CG resource). In some implementations, the response may contain a UL grant/DL assignment for a new transmission/retransmission. The response may be a PDCCH addressed to an RNTI (e.g., a C-RNTI, a CS-RNTI, a dedicated RNTI, an RNTI for an SDT, and/or an RNTI for a CG). In some implementations, the response may indicate an UL grant for a new transmission for the HARQ process used for the transmission of an UL transmission for small data (e.g., the UL message). In some implementations, the response may include a specific command (e.g., a TA command MAC CE). In some implementations, the response may be a message such as an RRCResume, RRCSetup, RRCRelease, RRCRelease with SuspendConfig, RRCReestablishment, and/or RRCReject, etc.

In some implementations, a UE may monitor the PDCCH based on at least one of the above-mentioned PDCCH monitoring alternatives (e.g., actions 502, 504, 506 in FIG. 5) until the UE receives an indication from the NW. In other words, the UE may stop monitoring the PDCCH if/after the UE receives an indication from the NW. In some implementations, the indication may be received through a message, such as an RRCResume, RRCSetup, RRCRelease, RRCRelease with SuspendConfig, RRCReestablishment, and/or RRCReject, etc. In some implementations, the indication may be a PDCCH addressed to an RNTI (e.g., a C-RNTI, a CS-RNTI, a dedicated RNTI, an RNTI for an SDT, and/or an RNTI for a CG). In some implementations, the indication may indicate to the UE to terminate the SDT procedure and/or the SDT transmission period (e.g., based on a field of parameter as the indicator). In some implementations, the indication may indicate to the UE to initiate an RRC procedure (e.g., an RRC connection resume procedure, RRC establishment procedure, and/or a RC reestablishment procedure). In some implementations, the indication may indicate to the UE to switch/fallback on the types for SDT (e.g., the types may be an RA-based SDT, a CG-based SDT, a 2-step RA, a 4-step RA, etc.).

In some implementations, a UE may monitor the PDCCH based on at least one of the above-mentioned PDCCH monitoring alternatives until a timer/window expires and/or is not running. In other words, the UE may stop monitoring the PDCCH if a timer/window expires and/or is not running. In some implementations, the timer/window may be a TA timer, ra-ResponseWindow, msgB-ResponseWindow, ra-ContentionResolutionTimer, configuredGrantTimer, cg-Retransmission Timer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, and/or T345. In some implementations, the timer/window may be an SDT failure detection timer. In some implementations, the timer/window may be used for monitoring a response (e.g., for an ACK/NACK) and/or for retransmission scheduling from a NW. In some implementations, the timer/window may be used for an SDT.

In some implementations, other PDCCH monitoring behaviors for SDT are also defined, such as PDCCH monitoring during a time period. In some implementations, during a time period (e.g., a measurement gap, a period for BWP switching, and/or a UE processing time), a UE (e.g., a MAC entity of the UE) may (e.g., on the SC(s) in the corresponding frequency range of the measurement gap configured by an IE measGapConfig as specified in [TS 38.331]) monitor the PDCCH if one or more of the following monitoring conditions are satisfied. In some implementations, one monitoring condition may include whether the UE is in an RRC_INACTIVE state or not. In some implementations, another monitoring condition may be when the (RA-based and/or CG-based) SDT procedure is ongoing. In some implementations, another monitoring condition may be after a CG configuration is configured/initiated. In some implementations, another monitoring condition may be when or after the CG resource/configuration is considered as valid. In some implementations, another monitoring condition may be after the UE initiates an SDT procedure. In some implementations, another monitoring condition may be after the UE considers a contention resolution to be successful for an RA procedure. In some implementations, another monitoring condition may be after the UE considers the RA procedure to be successfully completed. In some implementations, another monitoring condition may be after the UE transmits a UL message. In some implementations, another monitoring condition may be after the UE receives a response from a NW. In some implementations, another monitoring condition may be while a timer/window is running.

In some implementations, during a time period (e.g., a measurement gap, a period for BWP switching, and/or a UE processing time), the UE (e.g., a MAC entity of the UE) may not (e.g., on the SC(s) in the corresponding frequency range of the measurement gap configured by the IE measGapConfig as specified in [TS 38.331]) monitor the PDCCH if one or more of the following monitoring conditions are satisfied. In some implementations, one monitoring condition may be if the UE is in an RRC_INACTIVE state. In some implementations, one monitoring condition may be when the SDT procedure (e.g., an RA-based and/or a CG-based procedure) is ongoing. In some implementations, one monitoring condition may be after a CG configuration is configured/initiated. In some implementations, one monitoring condition may be when or after the CG resource/configuration is considered as valid. In some implementations, one monitoring condition may be after the UE initiates an SDT procedure. In some implementations, one monitoring condition may be after the UE considers a contention resolution to be successful for an RA procedure. In some implementations, one monitoring condition may be after the UE considers the RA procedure to be successfully completed. In some implementations, one monitoring condition may be after the UE transmits a UL message. In some implementations, one monitoring condition may be after the UE receives a response from a NW. In some implementations, one monitoring condition may be while a timer/window is running.

In some implementations, a UE may monitor the PDCCH if a timer/window (e.g., as aforementioned in the present disclosure) is running regardless of the possible occurrence of a measurement gap, a period for BWP switching, and/or a UE processing time.

In some implementations, other PDCCH monitoring behaviors for SDT are defined, such as collision of PDCCH monitoring occasions. In some implementations, a UE (e.g., in an RRC_INACTIVE state) may be configured with different PDCCH monitoring occasions for different purposes, for example, for paging/short message, for system information, for an RA, etc. In some implementations, the PDCCH monitoring occasions may be determined by SSs, CORESETs, and/or some parameters.

In some implementations, in terms of paging/short message, PDCCH monitoring occasions for paging (e.g., paging occasion) may be determined according to an ID pagingSearchSpace (e.g., as specified in 3GPP TS 38.213) and IDs firstPDCCH-MonitoringOccasionOfPO as well as nrofPDCCH-MonitoringOccasionPerSSB-InPO if configured (e.g., as specified in 3GPP TS 38.331). In some implementations, a UE may monitor the PDCCH for an SI change indication and/or a Public Warning System (PWS) notification (e.g., an earthquake and tsunami warning system, ETWS, or a commercial mobile alert service, CMAS) based on the paging occasion.

In some implementations, in terms of system information, for a SIB1, for example, PDCCH monitoring occasion(s) may be determined according to an ID searchSpaceSIB1. For other SI and/or SI message acquisition, PDCCH monitoring occasion(s) may be determined according to an ID searchSpaceOtherSystemInformation, e.g., searchSpaceSIB1.

In some implementations, in terms of an RA, an ID ra-SearchSpace may be configured for monitoring the PDCCH for an RA procedure (e.g., for monitoring an RAR).

In some implementations, configurations of PDCCH monitoring occasions for a UE to monitor (e.g., while the UE is in an RRC_INACTIVE state) a PDCCH may be included in a PDCCH-ConfigCommon IE (e.g., as shown in Table 1 below). In some implementations, the configurations may include one or more of a controlResourceSetZero, commonControlResourceSet, searchSpaceZero, commonSearchSpaceList, searchSpaceSIB1 searchSpaceOtherSystemInformation, pagingSearchSpace, ra-SearchSpace, firstPDCCH-MonitoringOccasionOfPO, and/or commonSearchSpaceListExt-r16, etc.

In 3GPP TS 38.213, a set of PDCCH candidates for a UE to monitor a PDCCH may be defined in terms of PDCCH SS sets. In some implementations, an SS set may be a CSS set or a USS set and a UE may monitor PDCCH candidates in one or more of the following SS sets. In some implementations, the UE may monitor the PDCCH candidates in a Type0-PDCCH CSS set configured by an IE pdcch-ConfigSIB1 in a MIB or by an ID searchSpaceSIB1 in an IE PDCCH-ConfigCommon or by an ID searchSpaceZero in the IE PDCCH-ConfigCommon for a DCI format with a CRC scrambled by a SI-RNTI on a primary cell of an MCG. In some implementations, the UE may monitor the PDCCH candidates in a Type0A-PDCCH CSS set configured by an ID searchSpaceOtherSystemInformation in the IE PDCCH-ConfigCommon for a DCI format with a CRC scrambled by a SI-RNTI on the primary cell of the MCG. In some implementations, the UE may monitor the PDCCH candidates in a Type1-PDCCH CSS set configured by an ID ra-SearchSpace in the IE PDCCH-ConfigCommon for a DCI format with a CRC scrambled by an RA-RNTI, an MsgB-RNTI, or a TC-RNTI on the primary cell. In some implementations, the UE may monitor the PDCCH candidates in a Type2-PDCCH CSS set configured by an ID pagingSearchSpace in the IE PDCCH-ConfigCommon for a DCI format with a CRC scrambled by a P-RNTI on the primary cell of the MCG. In some implementations, the UE may monitor the PDCCH candidates in a Type3-PDCCH CSS set configured by an ID SearchSpace in the IE PDCCH-Config with an ID searchSpaceType=common for DCI formats with a CRC scrambled by an INT-RNTI, SFI-RNTI, TPC-PUSCH-RNTI, TPC-PUCCH-RNTI, TPC-SRS-RNTI, or CI-RNTI and, only for the primary cell, a C-RNTI, MCS-C-RNTI, CS-RNTI(s), or PS-RNTI. In some implementations, the UE may monitor the PDCCH candidates in a USS set configured by an ID SearchSpace in the IE PDCCH-Config with an ID searchSpaceType=ue-Specific for DCI formats with a CRC scrambled by a C-RNTI, MCS-C-RNTI, SP-CSI-RNTI, CS-RNTI(s), SL-RNTI, SL-CS-RNTI, or SL Semi-Persistent Scheduling V-RNTI.

In some implementations, in terms of an SDT, a UE (e.g., in an RRC_INACTIVE state) may be configured with one or more SSs and/or one or more CORESETs for PDCCH monitoring (e.g., during an SDT procedure). In some implementations, the SS for an SDT may be a common SS (e.g., a type 1A-PDCCH CSS configured by sdt-SearchSpace, the type-1 PDCCH CSS configured by the ID ra-SearchSpace, the type-3 PDCCH CSS, and/or a new common SS configured from a system information/RRC release message). In some implementations, the SS for an SDT may be a UE-specific SS (e.g., a UE-specific SS configured by sdt-CG-SearchSpace, UE-specific SS configured from an RRC Release message, and/or a UE-specific SS configured from an Msg4/MsgB).

In some implementations, a CORESET for an SDT may be a common CORESET (e.g., a CORESET 0, a commonControlResourceSet). The CORESET for an SDT may be a UE-specific CORESET (e.g., a UE-specific CORESET configured from an RRC Release message, and/or a UE-specific CORESET configured from an Msg4/MsgB).

Figure 6:
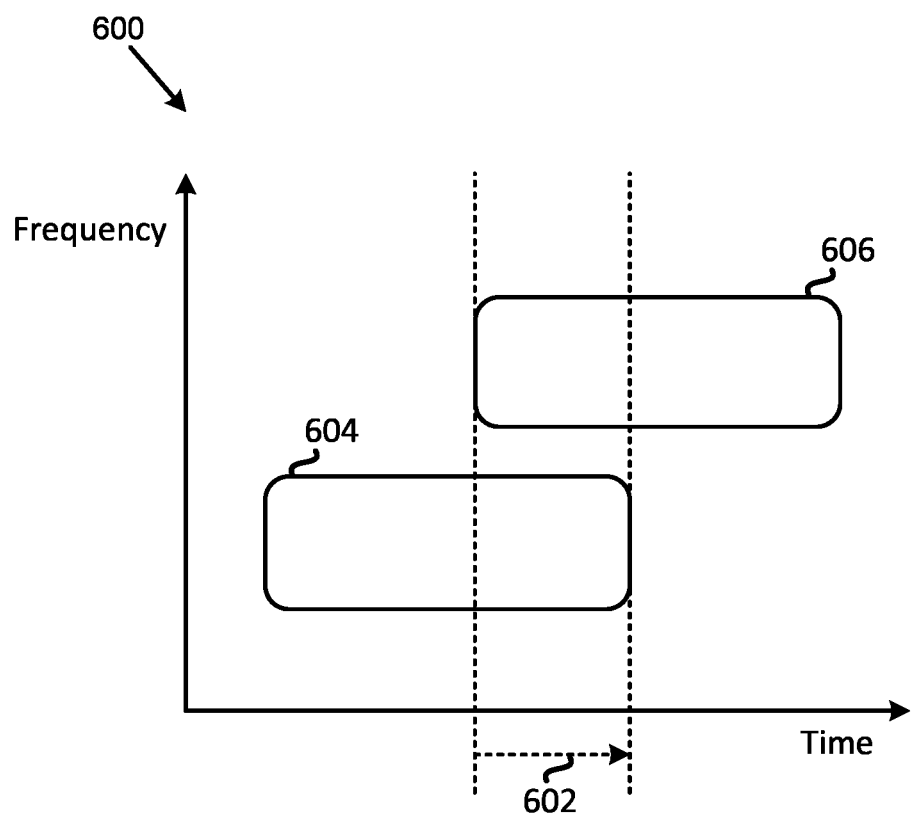
FIG. 6 is a schematic diagram illustrating an overlap period between different PDCCH monitoring occasions, according to an example implementation of the present disclosure.

In some implementations, different PDCCH monitoring occasions may partially or fully overlapped/collided, for example, in time domain (e.g., in the same symbol, slot, subframe, system frame, etc.) and/or frequency domain. FIG. 6 is a schematic diagram illustrating an overlap period between different PDCCH monitoring occasions, according to an example implementation of the present disclosure. FIG. 6 illustrates an overlap period 602, in the time domain, between a first PDCCH monitoring occasion 604 and a second PDCCH monitoring occasion 606. In some implementations, the first PDCCH monitoring occasion 604 may be configured for an SDT. In some implementations, the second PDCCH monitoring occasion 606 may be configured for other purposes (e.g., for a paging/short message, for system information, for an RA, etc.).

In some implementations, within an overlap period, a UE may not be able to monitor both of the first PDCCH monitoring occasion 604 and the second PDCCH monitoring occasion 606 at the same time (e.g., due to the lack of capability of the UE).

In other implementations, a UE may be able to monitor both the first PDCCH monitoring occasion 604 and the second PDCCH monitoring occasion 606 at the same time. For example, assuming that a UE is configured with at least two PDCCH monitoring occasions 604 and 606, where a first PDCCH candidate monitored in the first PDCCH monitoring occasion 604 may be configured for an SDT purpose(s), and a second PDCCH candidate monitored in the second PDCCH monitoring occasion 606 may be configured for other purposes (e.g., for a paging/short message, for system information, for an RA, etc.), the first PDCCH monitoring occasion 604 (e.g., for an SDT) may be configured by a first SS and/or a first CORESET.

In some implementations, the first SS may be a common SS (e.g., the type-1 PDCCH CSS configured by the IE ra-SearchSpace, the type-3 PDCCH CSS, and/or a new common SS configured from system information/RRC release message). In some implementations, the first SS may be CSS(s) configured in the IE PDCCH-ConfigCommon.

In some implementations, the first SS may be CSS(s) configured by the IE sdt-SearchSpace.

In some implementations, the first SS may be CSS(s) configured by the IE sdt-CG-SearchSpace.

In some implementations, the first SS may be a UE-specific SS (USS) (e.g., a UE-specific SS configured from an RRC Release message, and/or a UE-specific SS configured from an Msg4/MsgB). In some implementations, the first SS may be USS(s) configured in a CG configuration for SDT.

In some implementations, the first SS may be USS(s) configured in a BWP configured dedicated for SDT.

In some implementations, the first SS may be an SS set (e.g., a UE-specific SS set) configured via configuration(s) for an SDT. In some implementations, the first SS may be an SS set identified as specific search space set for an SDT. In some implementations, the first CORSET may be a common CORESET (e.g., a CORESET 0, a commonControlResourceSet). In some implementations, the first CORESET may be a UE-specific CORESET (e.g., a UE-specific CORESET configured from an RRC Release message, and/or a UE-specific CORESET configured from an Msg4/MsgB). In some implementations, the second PDCCH monitoring occasion (e.g., not for an SDT) may be configured by a second SS and/or a second CORESET. In some implementations, the second SS may be an IE searchSpaceZero, commonSearchSpaceList, searchSpaceSIB1, searchSpaceOtherSystemInformation, paging-SearchSpace, ra-SearchSpace, commonSearchSpaceListExt-r16, and/or etc. In some implementations, the second CORESET may be a controlResourceSetZero, commonControlResourceSet, and/or etc.

In some implementations, the second SS may be a common SS (e.g., the type-1 PDCCH CSS configured by the IE ra-SearchSpace, the type-3 PDCCH CSS, and/or a new common SS configured from system information/RRC release message).

In some implementations, the second SS may be CSS(s) configured in the IE PDCCH-ConfigCommon.

In some implementations, the second SS may be CSS(s) configured by the IE sdt-SearchSpace.

In some implementations, the second SS may be CSS(s) configured by the IE sdt-CG-SearchSpace.

In some implementations, a UE may not be expected to be configured/provided (e.g., by a NW) with the first PDCCH monitoring occasion 604 and/or the second PDCCH monitoring occasion 606, which are partially or fully overlapped in time domain (e.g., in the same symbol, slot, subframe, system frame, etc.) and/or frequency domain. In other words, the NW may not configure the UE with the first PDCCH monitoring occasion 604 and the second PDCCH monitoring occasion 606, which are partially or fully overlapped in the time domain (e.g., in the same symbol, slot, subframe, system frame, etc.) and/or the frequency domain.

In some implementations, the UE may determine whether to monitor the PDCCH by monitoring a first SS based on whether the first SS is configured/provided by the BS. If the first SS is configured/provided by the BS, the UE may monitor the PDCCH by monitoring a first SS. If the first SS is not configured/provided by the BS, the UE may monitor the PDCCH by monitoring a second SS, In some implementations, a UE may not be expected to monitor the first PDCCH monitoring occasion 604 and the second PDCCH monitoring occasion 606 at the same time. For example, a NW may not configure the first PDCCH monitoring occasion 604 and the second PDCCH monitoring occasion 606, which are fully or partially overlap in a time domain.

In some implementations, in a case that the first PDCCH monitoring occasion 604 and the second PDCCH monitoring occasion 606 are partially or fully overlapped/collided (e.g., in the same symbol, slot, subframe, system frame, etc.), a UE may select/prioritize one of the first PDCCH monitoring occasion 604 and the second PDCCH monitoring occasion 606 to monitor. In some implementations, the UE may select/prioritize the first PDCCH monitoring occasion 604. For example, if the first PDCCH monitoring occasion 604 and the second PDCCH monitoring occasion 606 are partially or fully overlapped/collided (e.g., in the same symbol, slot, subframe, system frame, etc.), the UE may only monitor the first PDCCH monitoring occasion 604 and the UE may not monitor the second PDCCH monitoring occasion 606. In some implementations, the UE may select/prioritize the second PDCCH monitoring occasion 606. For example, if the first PDCCH monitoring occasion 604 and the second PDCCH monitoring occasion 606 are partially or fully overlapped/collided (e.g., in the same symbol, slot, subframe, system frame, etc.), the UE may only monitor the second PDCCH monitoring occasion 606 and the UE may not monitor the first PDCCH monitoring occasion 604.

In some implementations, if the first PDCCH monitoring occasion 604 and the second PDCCH monitoring occasion 606 are partially or fully overlapped/collided (e.g., in the same symbol, slot, subframe, system frame, etc.), determining which PDCCH monitoring occasion should be selected/prioritized (e.g., by a UE) to monitor may be configured by a NW (e.g., via a configuration/parameter). In some implementations, if the UE is configured with a first parameter, the UE may select/prioritize the first PDCCH monitoring occasion 604. For example, the UE may only monitor the first PDCCH monitoring occasion 604 and the UE may not monitor the second PDCCH monitoring occasion 606. In some implementations, if the UE is configured with a second parameter, the UE may select/prioritize the second PDCCH monitoring occasion 606. For example, the UE may only monitor the second PDCCH monitoring occasion 606 and the UE may not monitor the first PDCCH monitoring occasion 604.

In some implementations, if a maximum number of non-overlapped CCEs per slot and/or the maximum number of monitored PDCCH candidates per slot for an RRC inactive state is determined, the first PDCCH candidate may be allocated before the second PDCCH candidate. In some implementations, if the DCI formats associated with the first PDCCH candidate and the DCI formats associated with the second PDCCH candidate have the same size, a UE may receive the first PDCCH candidate and the second PDCCH candidate over the same set of CCEs, or/and the first PDCCH candidate and the second PDCCH candidate have identical scrambling, the UE may monitor the first PDCCH candidate only. In some implementations, the first PDCCH candidate may always correspond to the lowest SS ID.

In some implementations, if a UE is configured with the first PDCCH monitoring occasion 604, the UE may only monitor the first PDCCH monitoring occasion 604 if one or more of following conditions are satisfied. Otherwise, the UE may not monitor the first PDCCH monitoring occasion 604. In some implementations, the UE may only monitor the first PDCCH monitoring occasion 604 while the UE is in an RRC_INACTIVE state. In some implementations, the UE may only monitor the first PDCCH monitoring occasion 604 when the SDT procedure (e.g., an RA-based and/or a CG-based procedure) is ongoing. In some implementations, the UE may only monitor the first PDCCH monitoring occasion 604 after a CG configuration is configured/initiated. In some implementations, the UE may only monitor the first PDCCH monitoring occasion 604 after the SDT transmission period has started. In some implementations, the UE may only monitor the first PDCCH monitoring occasion 604 when or after the UE has at least one valid CG configuration. In some implementations, the UE may only monitor the first PDCCH monitoring occasion 604 when or after the CG resource/configuration is considered as valid.

In some implementations, the UE may only monitor the first PDCCH monitoring occasion 604 after the UE initiates a SDT procedure (e.g., an RA-based and/or a CG-based procedure). In some implementations, the UE may only monitor the first PDCCH monitoring occasion 604 after the UE considers a contention resolution to be successful for an RA procedure. In some implementations, the UE may only monitor the first PDCCH monitoring occasion 604 after the UE considers the RA procedure to be successfully completed. In some implementations, the UE may only monitor the first PDCCH monitoring occasion 604 after the UE transmits a UL message (e.g., after the UE performs an SDT on a CG/DG resource, MSG3, MSGA, etc.). In some implementations, the UE may only monitor the first PDCCH monitoring occasion 604 after the UE receives a response from a NW.

In some implementations, the UE may only monitor the first PDCCH monitoring occasion 604 while a timer/window (e.g., the timer/window from, for example, the alternative 504 in FIG. 5 that controls the PDCCH monitoring, a DRX timer for an SDT from, for example, the alternative 506 in FIG. 5, etc.) is running. In some implementations, the UE may only monitor the first PDCCH monitoring occasion 604 before the UE moves to a different cell regardless of whether or not the CG configuration/PDCCH configuration was provided. In some implementations, the UE may only monitor the first PDCCH monitoring occasion 604 when or after a maximum number of monitored PDCCH candidates per slot, for the UE that is an RRC inactive state, is determined.

In some implementations of the present disclosure, an SDT transmission may be a DL and/or a UL data transmission. In some implementations a DRB may be associated with an LCH. The DRB(s), the LCH(s), and/or the LCG(s) may be (specifically) configured for an SDT. For example, a UE may receive a configuration, e.g., via an RRC release message, to indicate whether the DRB(s), the LCH(s), and/or the LCH(s) may be used for an SDT. In some implementations, the DRB(s)/LCH(s) configured for the SDT may not be suspended when the UE is in an RRC_INACTIVE state. In some implementations, the DRB(s)/LCH(s) configured for the SDT may resume when an SDT procedure is initiated.

Figure 7:
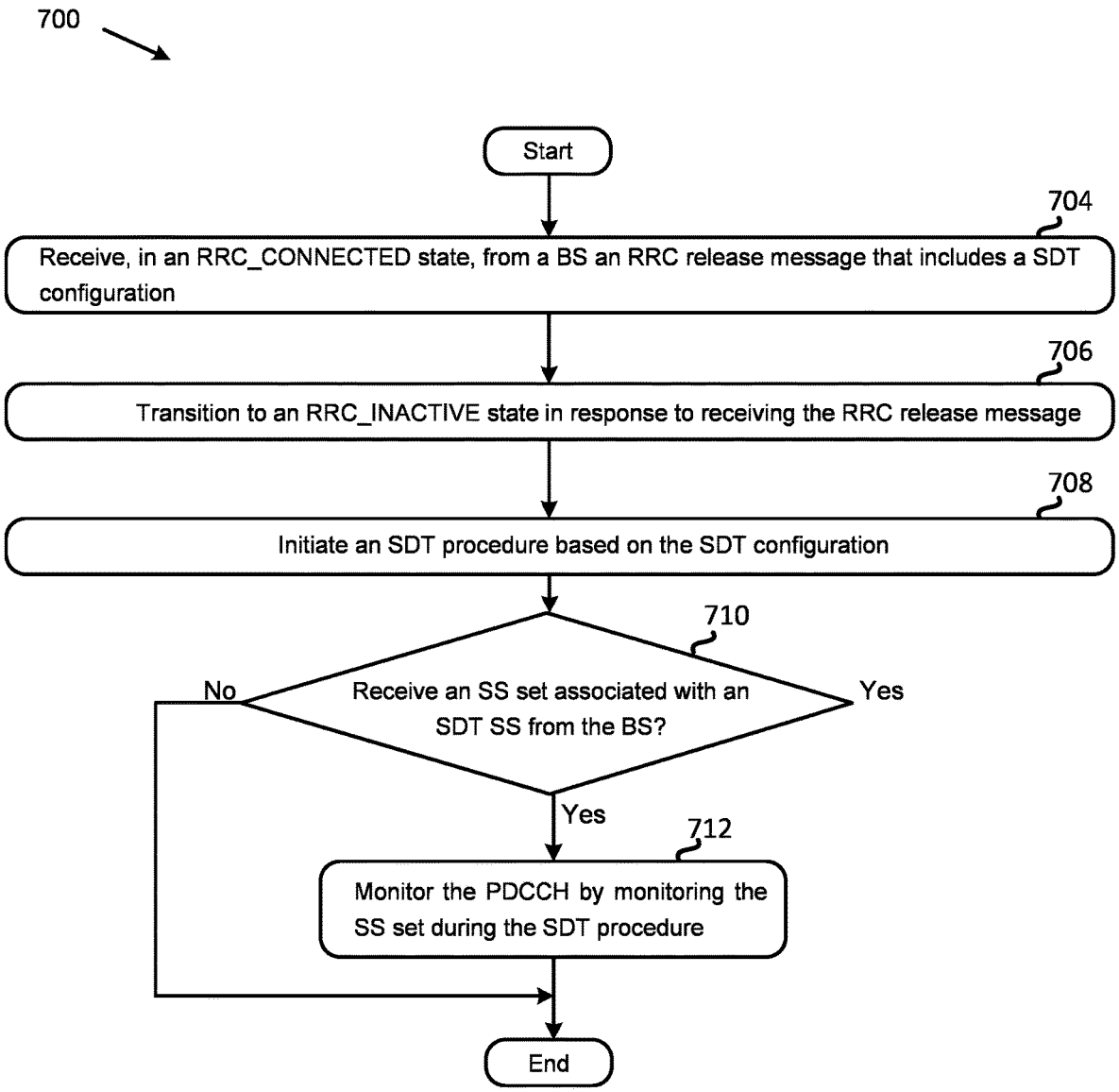
FIG. 7 is a flowchart illustrating a method or process for monitoring the PDCCH during an SDT procedure, according to an example implementation of the present disclosure.

FIG. 7 is a flowchart illustrating a method/process 700 for monitoring the PDCCH during an SDT procedure, according to an example implementation of the present disclosure. As illustrated in FIG. 7, process 700 may start, in action 704, by receiving, while the UE is in an RRC_CONNECTED state, from a BS, an RRC release message that includes an SDT configuration. After receiving the RRC release message, the UE, in action 706, may transition to an RRC_INACTIVE state in response to receiving the RRC release message. In action 708, the UE may initiate an SDT procedure based on the SDT configuration. In some such implementations, when the SDT procedure includes a random access (RA)-based SDT procedure, a search space (SS) set may include a common search space (CSS) set. In some such implementations, when the SS set includes the CSS set, the SDT SS may be configured via a PDCCH common configuration IE (e.g., a PDCCH-ConfigCommon). In some such implementations, when the SS set includes the CSS set, the SDT SS may be configured by the IE sdt-SearchSpace. In some implementations, when the SDT procedure includes a configured grant (CG)-based SDT procedure, the SS set may include a UE-specific search space (USS) set. In some such implementations, when the SS set includes the USS set, the SDT SS may be configured via a PDCCH configuration IE (e.g., PDCCH-Config) received in the RRC release message. In some such implementations, when the SDT procedure includes a CG-based SDT procedure, the SS may be USS(s) configured by the IE sdt-CG-SearchSpace. In some such implementations, when the SDT procedure includes a CG-based SDT procedure, the SS may be USS(s) configured in a CG configuration for SDT. In some such implementations, when the SDT procedure includes a CG-based SDT procedure, the SS may be USS(s) configured in a BWP configured dedicated for SDT.

After initiating the SDT procedure, the UE may determine, in action 710, whether an SS set associated with an SDT SS is received from the BS. In some such implementations, if the UE determines, in action 710, that the SS set associated with the SDT SS is not received from the BS, the process 700 may then end. In some implementations, however, after the process 700 determines that the SS set associated with the SDT SS is not received from the BS and the SDT procedure includes an RA-based SDT procedure, the process may monitor the PDCCH by monitoring a common SS set that is associated with an RA SS during the SDT procedure.

In some implementations, after initiating the SDT procedure in action 708, if the process determines, in action 710, that the SS set associated with the SDT SS is received from the BS, the UE may monitor, in action 712, the PDCCH, for example, by monitoring the SS set associated with the SDT SS during the SDT procedure. The process may then end.

In some such implementations, after the UE monitors the SS set during the SDT procedure, the UE may further determine whether the SDT procedure includes an RA-based SDT procedure or a CG-based SDT procedure.

In some implementations, if the UE determines that the SDT procedure includes an RA-based SDT procedure, the UE may monitor the PDCCH, for example, after determining that an RA procedure is successfully completed and until the RA-based SDT procedure is terminated. In some implementations, if the UE determines that the SDT procedure includes an RA-based SDT procedure, the UE may monitor the PDCCH addressed to a cell-radio network temporary identifier (C-RNTI).

In some implementations, if the UE determines that the SDT procedure includes a CG-based SDT procedure, the UE may monitor the PDCCH after an initial transmission for the CG-based SDT procedure and until the CG-based SDT procedure is terminated. In some implementations, if the UE determines that the SDT procedure includes a CG-based SDT procedure, the UE may monitor the PDCCH addressed to a C-RNTI and a configured scheduling-radio network temporary identifier (CS-RNTI).

Figure 8:
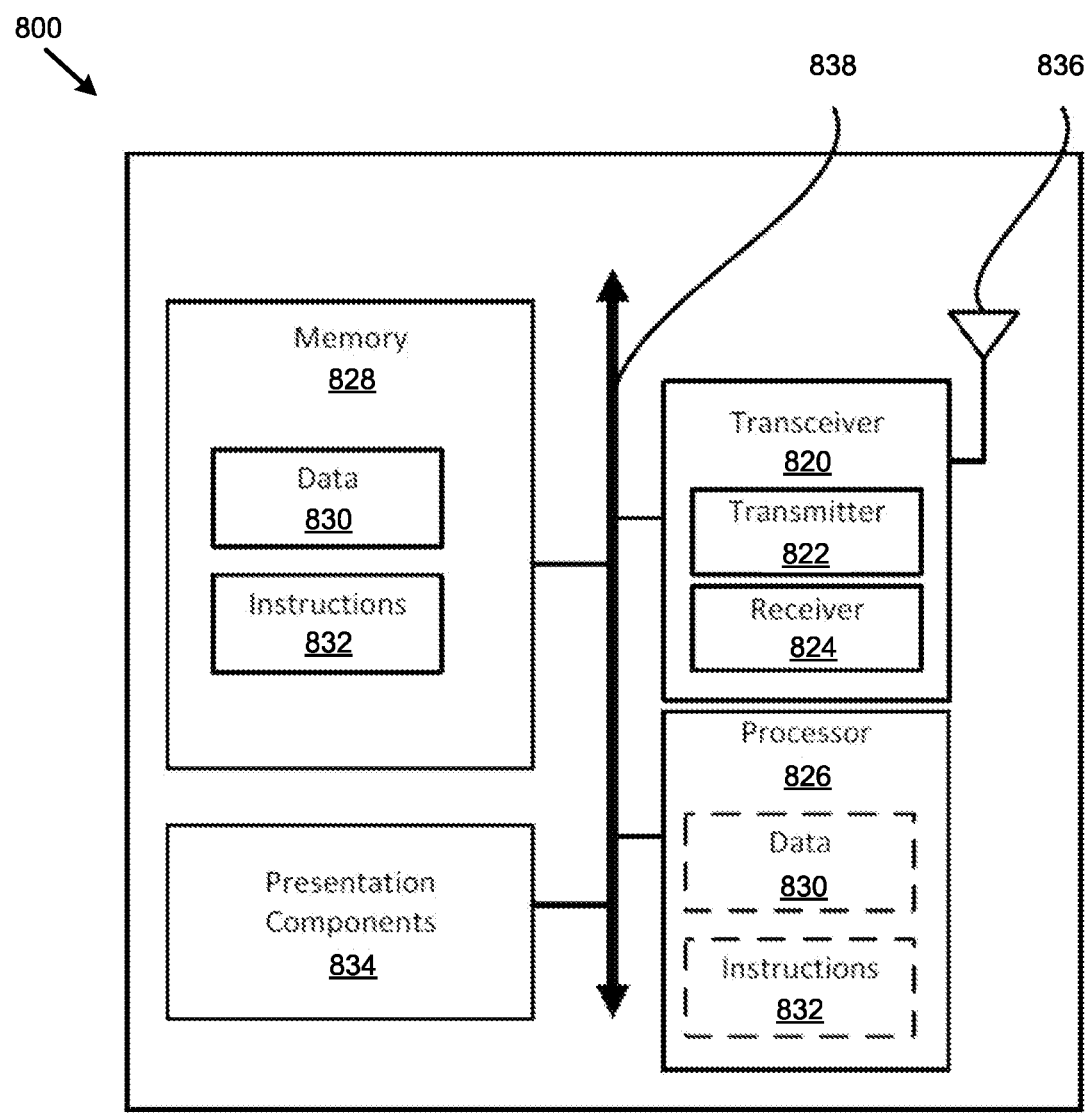
FIG. 8 is a block diagram illustrating a node for wireless communication, according to an example implementation of the present disclosure.

In some implementations of the present disclosure, the method and functions described with reference to FIGS. 1-7 may be implemented by a node, such as the node 800 depicted in FIG. 8. FIG. 8 is a block diagram illustrating a node 800 for wireless communication, according to one example implementation of the present disclosure. As shown in FIG. 8, the node 800 may include a transceiver 820, a processor 826, a memory 828, one or more presentation components 834, and at least one antenna 836. The node 800 may also include a Radio Frequency (RF) spectrum band module, a base station communications module, a network communications module, and a system communications management module, input/output (I/O) ports, I/O components, and a power supply (not explicitly shown in FIG. 8) in which each of the components above may be in communication with each other, directly or indirectly, over one or more buses 838.

The transceiver 820 may include a transmitter 822 and a receiver 824 configured to transmit and/or receive time and/or frequency resource partitioning information. In some implementations, the transceiver 820 may be configured to transmit in different types of subframes and slots including, but not limited to, usable, non-usable and flexibly usable subframes and slot formats. The transceiver 820 may be configured to receive data and control signaling.

The node 800 may include a variety of computer-readable media. Computer-readable media may be any available media accessible by the node 800 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media may embody computer-readable instructions, data structures, program modules or other data in a modulated data signal such as a carrier wave or other transport mechanism and includes any information delivery media. The term "modulated data signal" may be a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 828 may include computer-storage media in the form of volatile and/or non-volatile memory. The memory 828 may be removable, non-removable, or a combination thereof. Exemplary memory may include solid-state memory, hard drives, optical-disc drives, etc. As illustrated in FIG. 8, the memory 828 may store computer-readable, computer-executable instructions 832 (e.g., software codes) that are configured to, when executed, cause the processor 826 to perform various functions described herein, for example, with reference to FIGS. 2-7. Alternatively, instructions 832 may not be directly executable by the processor 826 but be configured to cause the node 800 (e.g., when compiled and executed) to perform various functions described herein.

The processor 826 may include an intelligent hardware device, for example, a central processing unit (CPU), a microcontroller, an ASIC, etc. The processor 826 may include memory. The processor 826 may process data 830 and instructions 832 received from the memory 828, and information through the transceiver 820, the base band communications module, and/or the network communications module. The processor 826 may also process information to be sent to the transceiver 820 for transmission through the antenna 836, and further to the network communications module for transmission to a core network.

The one or more presentation components 834 may present data indications to a person or other device. For example, the one or more presentation components 834 may include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method performed by a user equipment (UE) for monitoring a physical downlink control channel (PDCCH), the method comprising:
   receiving, while in a radio resource control (RRC)_CONNECTED state, from a base station (BS), an RRC release message that includes a small data transmission (SDT) configuration;
   transitioning to an RRC_INACTIVE state from the RRC_CONNECTED state in response to receiving the RRC release message;
   initiating an SDT procedure based on the SDT configuration;
   determining whether an SDT search space set is received from the BS;
   monitoring the PDCCH by monitoring the SDT search space set during the SDT procedure when the SDT search space set is received from the BS; and
   when the SDT search space set is not received from the BS and the SDT procedure comprises a random access (RA)-based SDT procedure, monitoring the PDCCH by monitoring a common search space (CSS) set that is associated with an RA search space during the RA-based SDT procedure, wherein
   the SDT configuration comprises a configured grant (CG) configuration for SDT, a signaling radio bearer (SRB) configuration for SDT, and a data radio bearer (DRB) configuration for SDT.

2. The method of claim 1, wherein, when the SDT search space set comprises the CSS set, the CSS set is configured via a PDCCH common configuration (PDCCH-ConfigCommon) information element (IE).

3. The method of claim 1, wherein, when the SDT procedure comprises the RA-based SDT procedure, monitoring the PDCCH comprises monitoring the PDCCH after determining that an RA procedure is successfully completed and until the RA-based SDT procedure is terminated.

4. The method of claim 1, wherein, when the SDT procedure comprises the RA-based SDT procedure, monitoring the PDCCH comprises monitoring the PDCCH addressed to a cell-radio network temporary identifier (C-RNTI).

5. The method of claim 1, wherein, when the SDT procedure comprises a CG-based SDT procedure, the SDT search space set comprises a UE-specific search space (USS) set.

6. The method of claim 5, wherein, when the SDT search space set comprises the USS set, the USS set is configured via a PDCCH configuration (PDCCH-Config) information element (IE) received in the RRC release message.

7. The method of claim 1, wherein, when the SDT procedure comprises a CG-based SDT procedure, monitoring the PDCCH comprises monitoring the PDCCH after an initial transmission for the CG-based SDT procedure and until the CG-based SDT procedure is terminated.

8. The method of claim 1, wherein, when the SDT procedure comprises a CG-based SDT procedure, monitoring the PDCCH comprises monitoring the PDCCH addressed to a cell-radio network temporary identifier (C-RNTI) and a configured scheduling-radio network temporary identifier (CS-RNTI).

9. A user equipment (UE) for monitoring a physical downlink control channel (PDCCH), the UE comprising:
   at least one processor; and
   at least one non-transitory computer-readable medium coupled to the at least one processor and storing one or more computer-executable instructions that, when executed by the at least one processor, cause the UE to:
      receive, while in a radio resource control (RRC)_CONNECTED state, from a base station (BS), an RRC release message that includes a small data transmission (SDT) configuration;
      transition to an RRC_INACTIVE state from the RRC_CONNECTED state in response to receiving the RRC release message;
      initiate an SDT procedure based on the SDT configuration;
      determine whether an SDT search space set is received from the BS;
      monitor the PDCCH by monitoring the SDT search space set during the SDT procedure when the SDT search space set is received from the BS; and
      when the SDT search space set is not received from the BS and the SDT procedure comprises a random access (RA)-based SDT procedure, monitor the PDCCH by monitoring a common search space (CSS) set that is associated with an RA search space during the RA-based SDT procedure, wherein
   the SDT configuration comprises a configured grant (CG) configuration for SDT, a signaling radio bearer (SRB) configuration for SDT, and a data radio bearer (DRB) configuration for SDT.

10. The UE of claim 9, wherein, when the SDT search space set comprises the CSS set, the CSS set is configured via a PDCCH common configuration (PDCCH-ConfigCommon) information element (IE).

11. The UE of claim 9, wherein, when the SDT procedure comprises the RA-based SDT procedure, monitoring the PDCCH comprises monitoring the PDCCH after determining that an RA procedure is successfully completed and until the RA-based SDT procedure is terminated.

12. The UE of claim 9, wherein, when the SDT procedure comprises the RA-based SDT procedure, monitoring the PDCCH comprises monitoring the PDCCH addressed to a cell-radio network temporary identifier (C-RNTI).

13. The UE of claim 9, wherein, when the SDT procedure comprises a CG-based SDT procedure, the SDT search space set comprises a UE-specific search space (USS) set.

14. The UE of claim 13, wherein, when the SDT search space set comprises the USS set, the USS set is configured via a PDCCH configuration (PDCCH-Config) information element (IE) received in the RRC release message.

15. The UE of claim 9, wherein, when the SDT procedure comprises a CG-based SDT procedure, monitoring the PDCCH comprises monitoring the PDCCH after an initial transmission for the CG-based SDT procedure and until the CG-based SDT procedure is terminated.

16. The UE of claim 9, wherein, when the SDT procedure comprises a CG-based SDT procedure, monitoring the PDCCH comprises monitoring the PDCCH addressed to a cell-radio network temporary identifier (C-RNTI) and a configured scheduling-radio network temporary identifier (CS-RNTI).

* * * * *